(12) United States Patent
Mason

(10) Patent No.: US 10,442,711 B2
(45) Date of Patent: Oct. 15, 2019

(54) METHOD AND SYSTEM FOR THE TREATMENT OF PRODUCED WATER AND FLUIDS WITH CHLORINE DIOXIDE FOR REUSE

(71) Applicant: SABRE INTELLECTUAL PROPERTY HOLDINGS LLC, Slingerlands, NY (US)

(72) Inventor: John Y. Mason, Odessa, TX (US)

(73) Assignee: Sabre Intellectual Property Holdings LLC, Slingerlands, NY (US)

( * ) Notice: Subject to any disclaimer, the term of this patent is extended or adjusted under 35 U.S.C. 154(b) by 665 days.

(21) Appl. No.: 14/776,403

(22) PCT Filed: Mar. 17, 2014

(86) PCT No.: PCT/US2014/030654
§ 371 (c)(1),
(2) Date: Sep. 14, 2015

(87) PCT Pub. No.: WO2014/145825
PCT Pub. Date: Sep. 18, 2014

(65) Prior Publication Data
US 2016/0060148 A1    Mar. 3, 2016

Related U.S. Application Data

(63) Continuation-in-part of application No. 13/837,936, filed on Mar. 15, 2013, now Pat. No. 9,238,587.
(Continued)

(51) Int. Cl.
*C02F 1/72*    (2006.01)
*C02F 1/74*    (2006.01)
(Continued)

(52) U.S. Cl.
CPC ............... *C02F 1/76* (2013.01); *C02F 1/727* (2013.01); *C02F 1/74* (2013.01); *C02F 1/763* (2013.01);
(Continued)

(58) Field of Classification Search
CPC .... C02F 1/727; C02F 1/74; C02F 1/76; C02F 1/763; C02F 1/78; C02F 2103/06;
(Continued)

(56) References Cited

U.S. PATENT DOCUMENTS 1,904,190 A    4/1933   Becher
2,866,683 A    12/1958   Avedikian
(Continued)

FOREIGN PATENT DOCUMENTS

CA    543589 A    7/1957
CA    825084 A    10/1969
(Continued)

OTHER PUBLICATIONS

Kimball, Robert, "Key Considerations for Frac Flowback/Produced Water Reuse and Treatment," NJWEA Annual Conference. NJ, Atlantic City. May 2012, Lecture. (http://www.aaee.net/DownloadCenter/2012NJWEAPresentation-RobertKimball.pdf).
(Continued)

*Primary Examiner* — Lucas A Stelling
(74) *Attorney, Agent, or Firm* — Foley Hoag LLP; Michael Gottselig

(57) ABSTRACT

Embodiments of the invention relate generally to methods and systems for treating aqueous systems associated with industrial wastewater applications, in particular gas and crude oil drilling, pumping and production, in order to reduce or eliminate contamination and allow the water that is treated to be reused, in particular, to be reused for hydraulic fracturing.

13 Claims, 7 Drawing Sheets

Related U.S. Application Data

(60) Provisional application No. 61/930,688, filed on Jan. 23, 2014.

(51) Int. Cl.
*C02F 1/76* (2006.01)
*C02F 1/78* (2006.01)
*C02F 9/00* (2006.01)
C02F 103/10 (2006.01)
C02F 103/06 (2006.01)
C02F 103/16 (2006.01)

(52) U.S. Cl.
CPC .............. *C02F 9/00* (2013.01); *C02F 1/78* (2013.01); *C02F 2103/06* (2013.01); *C02F 2103/10* (2013.01); *C02F 2103/16* (2013.01); *C02F 2209/29* (2013.01)

(58) Field of Classification Search
CPC .............. C02F 2103/10; C02F 2103/16; C02F 2209/29; C02F 9/00
See application file for complete search history.

(56) References Cited

U.S. PATENT DOCUMENTS

| | | | |
|---|---|---|---|
| 3,585,147 A | 6/1971 | Gordon | |
| 3,789,108 A | 1/1974 | Rapson | |
| 3,920,801 A | 11/1975 | Grotheer | |
| 3,998,714 A | 12/1976 | Armstrong | |
| 4,081,520 A | 3/1978 | Swindells et al. | |
| 4,084,747 A | 4/1978 | Alliger | |
| 4,086,329 A | 4/1978 | Cowley et al. | |
| 4,234,433 A | 11/1980 | Rhudy et al. | |
| 4,250,144 A * | 2/1981 | Ratigan | C01B 11/024 210/754 |
| 4,272,019 A | 6/1981 | Halaby, Jr. | |
| 4,310,425 A | 1/1982 | Key et al. | |
| 4,313,827 A | 2/1982 | Ratigan et al. | |
| 4,465,658 A | 4/1984 | Fredette | |
| 4,473,115 A | 9/1984 | Oakes | |
| 4,482,459 A | 11/1984 | Shiver | |
| 4,504,442 A | 3/1985 | Rosenblatt et al. | |
| 4,590,057 A | 5/1986 | Hicks | |
| 4,596,648 A | 6/1986 | Sweeney | |
| 4,627,969 A | 12/1986 | Fredette et al. | |
| 4,681,739 A | 7/1987 | Rosenblatt et al. | |
| 4,689,169 A | 8/1987 | Mason et al. | |
| 4,731,193 A | 3/1988 | Mason et al. | |
| 4,780,333 A | 10/1988 | Smith et al. | |
| 4,804,478 A * | 2/1989 | Tamir | C02F 1/78 210/143 |
| 4,805,708 A | 2/1989 | Matza et al. | |
| 4,823,826 A | 4/1989 | Sacco | |
| 4,839,152 A | 6/1989 | Vella et al. | |
| 4,846,981 A | 7/1989 | Brost | |
| 4,871,022 A | 10/1989 | McGlathery | |
| 4,886,653 A | 12/1989 | Gasper et al. | |
| 4,889,654 A | 12/1989 | Mason et al. | |
| 4,892,148 A | 1/1990 | Mason | |
| 4,908,188 A | 3/1990 | Jefferis, III et al. | |
| 4,925,645 A | 5/1990 | Mason | |
| 4,945,992 A | 8/1990 | Sacco | |
| 4,964,466 A | 10/1990 | Williams et al. | |
| 5,016,714 A | 5/1991 | McCabe et al. | |
| 5,018,578 A | 5/1991 | El Rabbaa et al. | |
| 5,031,700 A | 7/1991 | McDougall et al. | |
| 5,038,864 A | 8/1991 | Dunleavy et al. | |
| 5,141,722 A | 8/1992 | Nagashima | |
| 5,204,081 A | 4/1993 | Mason et al. | |
| 5,207,532 A | 5/1993 | Mason et al. | |
| 5,227,031 A | 7/1993 | Sundblad | |
| 5,227,306 A | 7/1993 | Eltomi et al. | |
| 5,256,310 A | 10/1993 | Brooks | |
| 5,258,171 A | 11/1993 | Eltomi | |
| 5,433,938 A | 7/1995 | Wilson et al. | |
| 5,478,802 A | 12/1995 | Moradi-Araghi | |
| 5,538,631 A * | 7/1996 | Yeh | B01D 21/0018 210/109 |
| 5,565,180 A | 10/1996 | Spink | |
| 5,631,300 A | 5/1997 | Wellinghoff | |
| 5,707,546 A | 1/1998 | Pitochelli | |
| 5,713,137 A | 2/1998 | Fujita | |
| 5,779,914 A * | 7/1998 | Brown | C02F 1/722 210/749 |
| 5,820,822 A | 10/1998 | Kross | |
| 5,858,322 A | 1/1999 | Gray | |
| 5,861,096 A | 1/1999 | Mason et al. | |
| 5,932,085 A | 8/1999 | Cowley et al. | |
| 5,964,290 A | 10/1999 | Riese et al. | |
| 5,967,233 A | 10/1999 | Riese et al. | |
| 5,968,454 A | 10/1999 | Deacon et al. | |
| 6,042,802 A | 3/2000 | Drake | |
| 6,059,973 A | 5/2000 | Hudson et al. | |
| 6,074,562 A | 6/2000 | Falkner | |
| 6,077,495 A | 6/2000 | Speronello et al. | |
| 6,083,457 A | 7/2000 | Parkinson et al. | |
| 6,284,152 B1 | 9/2001 | Kross | |
| 6,322,768 B1 | 11/2001 | Graff et al. | |
| 6,327,812 B1 | 12/2001 | Hedman et al. | |
| 6,333,005 B1 | 12/2001 | Nguyen | |
| 6,343,653 B1 | 2/2002 | Mason et al. | |
| 6,363,734 B1 | 4/2002 | Aoyagi | |
| 6,380,136 B1 | 4/2002 | Bates et al. | |
| 6,431,279 B1 | 8/2002 | Zaid et al. | |
| 6,468,479 B1 | 10/2002 | Mason et al. | |
| 6,500,465 B1 | 12/2002 | Ronlan | |
| 6,537,821 B1 | 3/2003 | Rosenblatt et al. | |
| 6,551,518 B2 * | 4/2003 | Gargas | C02F 1/78 205/752 |
| 6,645,457 B2 | 11/2003 | Mason et al. | |
| 6,711,830 B2 | 3/2004 | Hensley et al. | |
| 6,764,980 B2 | 7/2004 | Bates et al. | |
| 6,790,427 B2 | 9/2004 | Charles et al. | |
| 6,840,251 B2 | 1/2005 | Gill et al. | |
| 6,849,201 B2 | 2/2005 | Inagaki et al. | |
| 6,960,330 B1 | 11/2005 | Cox, Jr. | |
| 6,981,549 B2 | 1/2006 | Morales et al. | |
| 7,131,495 B2 | 11/2006 | Hao et al. | |
| 7,306,035 B2 | 12/2007 | Collins et al. | |
| 7,514,005 B2 | 4/2009 | Browne et al. | |
| 7,563,377 B1 | 7/2009 | Simpson | |
| 7,578,968 B1 | 8/2009 | Nalepa et al. | |
| 7,615,518 B2 | 11/2009 | Perry et al. | |
| 7,678,280 B2 | 3/2010 | Mueller | |
| 7,678,388 B2 | 3/2010 | Mason | |
| 7,712,534 B2 | 5/2010 | Bryant et al. | |
| 7,867,399 B2 | 1/2011 | Jones et al. | |
| 7,878,248 B2 | 2/2011 | Abad et al. | |
| 7,897,063 B1 | 3/2011 | Perry et al. | |
| 7,935,161 B1 | 5/2011 | Jones et al. | |
| 7,955,419 B2 | 6/2011 | Casella | |
| 7,964,101 B2 | 6/2011 | Slough et al. | |
| 8,083,935 B2 | 12/2011 | Eia | |
| 8,226,832 B2 | 7/2012 | Angelilli et al. | |
| 8,287,625 B2 | 10/2012 | Casella | |
| 8,573,302 B2 | 11/2013 | Robb et al. | |
| 8,609,594 B2 | 12/2013 | Mason | |
| 8,703,656 B2 | 4/2014 | Mason | |
| 8,789,592 B2 | 7/2014 | Mason | |
| 8,997,862 B2 | 4/2015 | Mason | |
| 9,238,587 B2 | 1/2016 | Mason | |
| 10,308,533 B2 | 6/2019 | Mason | |
| 2001/0007314 A1 | 7/2001 | Sherman | |
| 2001/0036421 A1 | 11/2001 | Speronello et al. | |
| 2001/0038805 A1 | 11/2001 | Hamilton et al. | |
| 2001/0050258 A1 | 12/2001 | Gargas | |
| 2002/0021990 A1 | 2/2002 | Cowley et al. | |
| 2002/0036284 A1 | 3/2002 | Speronello et al. | |
| 2002/0125196 A1 | 9/2002 | Rosenblatt et al. | |
| 2003/0082073 A1 | 5/2003 | Mankovitz | |
| 2003/0138371 A1 | 7/2003 | McWhorter et al. | |
| 2003/0203827 A1 | 10/2003 | Cooper et al. | |
| 2004/0120853 A1 | 7/2004 | Carpenter et al. | |

(56) References Cited

U.S. PATENT DOCUMENTS

| | | |
|---|---|---|
| 2004/0173525 A1 | 9/2004 | Hunniford et al. |
| 2004/0200779 A1 | 10/2004 | Newkirk et al. |
| 2004/0224855 A1 | 11/2004 | Hao et al. |
| 2004/0259188 A1 | 12/2004 | Rosenblatt et al. |
| 2005/0019210 A1 | 1/2005 | Rosenblatt et al. |
| 2005/0031487 A1 | 2/2005 | Rosenblatt et al. |
| 2005/0244328 A1 | 11/2005 | Schmitz et al. |
| 2005/0249658 A1 | 11/2005 | Tarbet |
| 2006/0096930 A1* | 5/2006 | Beardwood ............... C02F 1/76 210/743 |
| 2006/0162928 A1 | 7/2006 | Collins et al. |
| 2007/0102359 A1* | 5/2007 | Lombardi ............... C02F 9/00 210/639 |
| 2007/0116637 A1 | 5/2007 | Woodruff et al. |
| 2007/0149720 A1 | 6/2007 | Davis et al. |
| 2007/0295936 A1 | 12/2007 | Byrne et al. |
| 2007/0298979 A1 | 12/2007 | Perry et al. |
| 2008/0003507 A1 | 1/2008 | Nanjundiah |
| 2009/0062156 A1 | 3/2009 | Wilson et al. |
| 2009/0229827 A1 | 9/2009 | Bryant et al. |
| 2010/0012331 A1 | 1/2010 | Larter et al. |
| 2010/0059226 A1 | 3/2010 | Termine et al. |
| 2010/0178356 A1 | 7/2010 | Martin |
| 2010/0190666 A1 | 7/2010 | Ali et al. |
| 2011/0005969 A1 | 1/2011 | Giffin |
| 2011/0024361 A1* | 2/2011 | Schwartzel ............ C02F 1/325 210/739 |
| 2011/0129388 A1 | 6/2011 | Alarid et al. |
| 2011/0132815 A1 | 6/2011 | Angelilli et al. |
| 2011/0137465 A1 | 6/2011 | Angelilli et al. |
| 2011/0214859 A1 | 9/2011 | Loveless et al. |
| 2011/0214860 A1 | 9/2011 | Tonmukayakul et al. |
| 2011/0214868 A1 | 9/2011 | Funkhouser et al. |
| 2011/0220587 A1 | 9/2011 | Duve |
| 2011/0233136 A1 | 9/2011 | Enos et al. |
| 2011/0236961 A1 | 9/2011 | Casella |
| 2012/0073821 A1 | 3/2012 | Holtsclaw et al. |
| 2012/0157356 A1 | 6/2012 | Dawson et al. |
| 2012/0244228 A1 | 9/2012 | Mason |
| 2013/0000915 A1 | 1/2013 | Giffin |
| 2013/0009092 A1 | 1/2013 | Ziegler |
| 2013/0017241 A1 | 1/2013 | Andrews et al. |
| 2013/0056214 A1 | 3/2013 | Alsop et al. |
| 2013/0164388 A1 | 6/2013 | Mason |
| 2013/0206398 A1 | 8/2013 | Tufano et al. |
| 2013/0264293 A1 | 10/2013 | Keasler et al. |
| 2013/0288934 A1 | 10/2013 | Powell et al. |
| 2014/0020899 A1 | 1/2014 | Mason |
| 2014/0311734 A1 | 10/2014 | Mason |
| 2015/0197686 A1 | 7/2015 | Mason |
| 2016/0090315 A1 | 3/2016 | Mason |
| 2016/0221826 A1 | 8/2016 | Mason |

FOREIGN PATENT DOCUMENTS

| | | |
|---|---|---|
| CA | 826577 A | 11/1969 |
| CA | 1207269 | 7/1986 |
| CN | 1107438 A | 8/1995 |
| CN | 1266017 A2 | 9/2000 |
| CN | 101078343 A | 11/2007 |
| CN | 101081694 A | 12/2007 |
| DE | 3718272 A1 | 12/1988 |
| EP | 0 519 152 A1 | 12/1992 |
| GB | 2170220 A | 7/1986 |
| JP | H10182106 A | 7/1998 |
| WO | 8501722 A1 | 4/1985 |
| WO | 93/18781 A1 | 9/1993 |
| WO | 98/50310 A1 | 11/1998 |
| WO | 01/60750 A2 | 8/2001 |
| WO | 01/94256 A2 | 12/2001 |
| WO | 02/14216 A1 | 2/2002 |
| WO | 02/072484 A1 | 9/2002 |
| WO | WO-2003016224 A1 | 2/2003 |
| WO | 03/059401 A2 | 7/2003 |
| WO | 03/062144 A1 | 7/2003 |
| WO | 03/077956 A2 | 9/2003 |
| WO | 03/082553 A1 | 10/2003 |
| WO | 2005/123145 A2 | 12/2005 |
| WO | 2010/077393 A1 | 7/2010 |
| WO | 2012/129420 A2 | 9/2012 |
| WO | 2012/166670 A2 | 12/2012 |
| WO | 2014/145825 A1 | 9/2014 |
| WO | 2014/176333 A1 | 10/2014 |
| WO | 2014/176339 A1 | 10/2014 |
| WO | 2015/108929 A2 | 7/2015 |
| WO | 2017/106696 A2 | 6/2017 |

OTHER PUBLICATIONS

Kimball, Bob, "Key Considerations for Frac Flowback/Produced Water Reuse and Treatment," NJWEA Annual Conference, NJ, Atlantic City, May 9-13, 2011. Lecture. (http://www.aaee.net/DownloadCenter/Presentation-BobKimball.pdf).

Baker, J., et al., Testimony Before Committee on Science of U.S. House of Representatives Hearing on "The Decontamination of Anthrax and other Biological Agents," Nov. 8, 2001.

Chin et al. "Anthrax," Control of Communicable Diseases Manual, 17th Ed., American Public Health Association, (www.anthrax.osd.mil), pp. 20-25, 2000.

Coates, D. "An evaluation of the use of chlorine dioxide (Tristel One-Shot) in an automated washer/disinfector (Medivator) fitted with a chlorine dioxide generator for decontamination of flexible endoscopes," Journal of Hospital Infection, vol. 48, Issue 1, pp. 55-65, 2001.

Cross, G.L.C., et al. "The effects of controlled exposure to formaldehyde vapour on spores of Bacillus globigii NCTC 10073," Journal of Applied Bacteriology, vol. 68, pp. 461-469, 1990.

Dawson, et al., "A New Approach to Biocide Application Offers Improved Efficiency in Fracturing Fluids, in SPE/EAGE." European Unconventional Resources Conference and Exhibition, 2012.

Dixon, B.S., et al. "Antrhax," The New England Journal of Medicine, vol. 341, No. 11, pp. 815-826, 1999.

Gdanski, R., et al. Measurement of Breaker Requirements for Concentrated HPG Solutions, 9th SPE European Formation Damage Conference Proceedings, Noordwijk, The Netherlands, 2001.

Hawley, R.J., et al., "Protection Against Biological Warfare Agents," In D.D. Block (ed.), Disinfection, Sterilization and Preservation, 5th Edition, Lippincott, Williams, and Wilkins, Philadelphia, PA, pp. 1161-1167 (Date Unavailable).

Hawley, R.J., et al. "Biological Weapons—A Primer for Microbiologists," Ann Rev. Microbiol., vol. 55, pp. 235-253, 2001.

Hawley, R.J., et al. "Bioterrorism and Biological Safety," Chapter 37 in Biological Safety: Principles Practices, 3rd ed., pp. 567-578, 2000.

Horinko, M.L., Office of Solid Waste and Emergency Response. Memorandum FIFRA Crisis Exemption for Anthrax Incidents [online] Nov. 30, 2001. [retrieved Apr. 27, 2004]. Retrieved from the Internet <URL: http://www.epatechbit.org/pdf/AnthraxCrisisExempt3rd.pdf>.

Ishizaki, K., et al., "Inactivation of Bacillus Spores by Gaseous Ozone," J. of Applied Bacteriology, 60:67-72 (1986).

Jeng D.K., et al., "Chlorine Dioxide Gas Sterilization of Oxygenators in an Industrial Scale Sterilizer: A Successful Model," Artif Organs; Oct.: 14(5):361-8(1990).

Jeng D.K., et al., "Chlorine Dioxide Gas Sterilization Under Square—Wave Conditions," Applied and Environmental Microbiology: 56(2):514-19 (1990).

Joslyn, L.J. Gaseous Chemical Sterilization, Chap. 16 of Disinfection, Sterilization and Preservation, 5th ed. (ed. S.S. Block), pp. 337-359. Lippincott, Williams & Wilkins, New York, NY (2001).

Keasler, V., et al. "Identificaiton and Analysis of Biocides Effective Against Sessile Organisms," SPE International Symposium on Oilfield Chemistry, The Woodlands, Texas, Apr. 20-22, 2009.

Knapp, J.E. and Battisti, D.L., Chlorine Dioxide, Chap. 11 of Disinfection, Sterilization and Preservation, 5th ed. (ed. S. S. Block), pp. 215-227. Lippincott, Williams & Wilkins, New York, NY (2001).

(56) References Cited

OTHER PUBLICATIONS

Kuijvenhoven, et al., "Bacteria and Microbiologically Induced Corrosion Control in Unconventional Gas Field," Corrosion, 2011.
Merck Index, 12th Ed.; p. 362 "Chlorine Dioxide" (2001).
Meselson, M., et al., "The Sverdlovsk Anthrax Outbreak of 1979," Science; vol. 266, pp. 1202-1208, 1994.
Montgomery, "Effective and Sustainable Hydraulic Fracturing," Chapter 2, Intech, May 17, 2013.
"Removing Teak Oil Stains, Gas-out Mildew," DIY Boat Owner, vol. #2, p. 48, 2001.
Robinson, "The Application of Chemicals to Drilling and Producing Operations," Drilling and Production Practice, 1940.
Rutala, W.A. APIC Guideline for Selection and Use of Disinfectants, Amer. J. Infection Control, vol. 24 No. 4, pp. 313-342, 1996.
Syfan, Jr., et al., "65 years of Fracturing Experience: the Key to Better Productivity is Not What We Have Learned, But What We Have Forgotten and Failed to Utilize!," in SPE Annual Technical Conference and Exhibition, 2013.
Vogt, B.M., et al., "How Clean is Safe? Improving the Effectiveness of Decontamination of Structures and People Following Chemical and Biological Incidents," Final Report Prepared for the U.S. Department of Energy Chemical and Biological National Security Program, ORNL/TM-2002/178, published, Oct. 2002.
Volt, et al., "Chlorine Oxides and Chlorine Oxygen Acids," Ullman's Encyclopedia of Industrial Chemistry, vol. 8, pp. 523-684 (Date Unavailable).
Simpson, G.D., et al. "A Focus on Chlorine Dioxide, An Ideal Biocide," http://www.clo2.com:80/reading/waste/corrosion.html, visited Apr. 3, 2002 (Feb. 5, 2000).
Weaver-Meyers, P.L. et al., "Controlling Mold on Library Materials with Chlorine Dioxide: An Eight Year Case Study," Journal of Academic Librarianship, pp. 455-458, Nov. 1998.
Whitney, E.A., et al., "Inactivation of Bacillus anthracis Spores," Emerging Infectious Diseases, vol. 9, No. 6, pp. 523-627, Jun. 2003.
Bulletin #055, "Solutions to Air Pollution Control. Corrosion Resistant Air Emissions Equipment," Plasticair, Inc., Mississauga, Ontario, Canada, Mar. 1997.
CDG Technology website, www.cdgtechnology.com; Oct. 21, 2003, hardcopy.
Fair, J.R., et al., Gas Absorption and Gas-Liquid System Design, pp. 14-1 to 14-98, at 14-4, 14-6 in Green D., ed., Perry's Chemical Engineers Handbook, 7.sup.th Ed., McGraw-Hill, New York, 1997.
Gildow, J.S. "Anthrax: General Overview and Environmental Decontamination Recommendations," Caltech Industries, Inc., Fast-Acting Surface Disinfectants for Point-of-Care, www.caltechind.com, (2001).
Deshwal, et al., "Kinetics and mechanism of chloride based chlorine dioxide generation process from acidic sodium chlorate," Journal of Hazadous Materials, 108(3): pp. 173-182 (2004).
Madduri, "Acidified Sodium Chlorite (ASC) Chemical and Technical Assessment," Sixty-Eighth Meeting of the Joint FAO/WHO Expert Committee on Food Additives, 12 pages, Jan. 1, 2007.
International Preliminary Report on Patentability, PCT/US2014/030654, entitled "Method and System for Treatment Of Produced Water and Fluids With Chlorine Dioxide for Reuse", filed on Mar. 17, 2014, dated Sep. 24, 2015.
International Search Report and Written Opinion issued in PCT/US2014/030654, dated Jul. 10, 2014.

\* cited by examiner

STAGE 3
CEASE CHLORINE OXIDE TREATMENT
AND INTRODUCE AIR THROUGH VENTURI

STAGE 4
CONTINUE ALTERNATING CHLORINE OXIDE/AIR
TREATMENT UNTIL CHLORINE DIOXIDE RESIDUAL
MEASURED

FIG. 9 (Cont)

METHOD AND SYSTEM FOR THE TREATMENT OF PRODUCED WATER AND FLUIDS WITH CHLORINE DIOXIDE FOR REUSE

CROSS REFERENCE TO RELATED APPLICATIONS

This application is a U.S. National Phase filing under 35 U.S. C. § 371 of International Application No. PCT/US2014/030654, filed Mar. 17, 2014, and published as WO 2014/145825 on Sep. 18, 2014, which claims benefit of priority to U.S. Provisional Patent Application Ser. No. 61/930,688, filed Jan. 23, 2014 and is a continuation in part of U.S. patent application Ser. No. 13/837,936, filed Mar. 15, 2013 and issued as U.S. Pat. No. 9,238,587 on Jan. 19, 2016. The entire contents of each of said applications are hereby incorporated herein by reference.

FIELD OF THE INVENTION

The recited claims relate generally to methods and systems for treating produced water associated with gas and crude oil drilling, pumping and production, including but not limited to hydraulic fracturing. More particularly, the recited claims relate to an improved method and system of treating produced water, flowback water, source water or other industrial aqueous fluids in order to reduce contamination and bring the treated water to appropriate standards that allows the treated water to be reused for hydraulic fracturing.

INTRODUCTION

In oil and gas production, tremendous amounts of water are used as part of the overall process. Of primary interest is the large amount of water that is used to fracture oil or gas wells to enhance the production from a given formation. The water that is used in this process must be free of contaminants that can impact the performance of the fracking process. In particular, hydrocarbon metals, inorganic contaminants or metal ions, phosphates, volatile organic compounds (VOCs), total dissolved solids (TDS) and other contaminants can impede the performance of the polymers used to reduce friction and/or to keep sand in suspension. Also of importance is the reduction or elimination of bacterial contamination that can reduce polymer performance and/or contaminate the producing formation. For example, bacterial contamination of the formation can cause plugging or loss of production and cause the formation of hydrogen sulfide which impacts the operability of the well and the value of the produced product. The present invention provides a process to treat produced water and achieve standards that will allow the treated produced water to be reused in a subsequent hydraulic fracturing process.

Various methods and systems for the treatment of produced water have been explored and are known in the art. Examples of these technologies are reverse osmosis, microfiltration, electrocoagulation, and other technologies. These technologies have severe limitations regarding the variety of contaminants they can deal with in a single step, and high operating costs with relatively low throughput treatment rates. For example, while reverse osmosis (RO) is effective in eliminating ionic contaminants, hydrocarbon contaminants can severely plug and or damage the (RO) membrane making this technology commercially unrealistic. Similarly, the presence of certain cations and anions can cause fouling, scaling, or other forms of interference.

Wastewater associated with the production of crude oil, i.e. oilfield water, generally consists of two primary sources: flow-back water and produced water. The reuse of these waters is typically difficult due to high contaminant and bacterial loading. More specifically, oilfield water and fracturing fluids (or frac water) can be contaminated with, for example, bacteria, naturally-occurring organics in the formation, organic treatment chemicals (such as viscosifiers, emulsion stabilizers, etc), and production chemicals (such as scale reducers, friction reducers, anti-corrosive chemicals, pH modifiers, etc.), and/or other contaminants that result in a high percentage of TDS. The presence of these contaminants can interfere with later re-use of the water, storage and/or disposal (e.g. injection into disposal wells or sent to municipal treatment facilities).

Municipal treatment facilities are facing increasing regulatory requirements for wastewater associated with hydraulic fracturing and satisfying these requirements is costly. Similarly, to the extent contaminated frac and oilfield waters are stored in oilfield pits, open pools, or lagoons, high residual polymer levels and solids loading within the pits can contribute to high hydrogen sulfide production, causing safety and environmental concerns.

More recently, producers are shifting to closed loop systems as the preferred method of handling flowback and produced waters (i.e. reusing these waters in subsequent operations). As such, the water used for hydraulic fracturing operations is often a combination of produced and/or flowback water, surface water and/or municipal water (also known as "commingled water"). Successful treatment of the contaminated produced water in storage pits and tanks allows commingled water to be made up of a larger percentage of produced water than it would otherwise, and in turn, provide for reduced disposal costs, fresh water costs, and lower water use/reuse concerns. Low cost, simple technologies are desirable so that small producers or isolated production areas can use the treatment processes easily.

The process disclosed herein is a lower cost, unexpectedly effective treatment method that works well under difficult process conditions associated with produced waters from oil and gas drilling/production, for example, that contain high levels of one or more of calcium (Ca), magnesium (Mg), barium (Ba), iron (Ferrous, $Fe^{2+}$ or Ferric, $Fe^{3+}$), manganese (Mn), as well as hydrocarbons, sulfates (SO4), total organic carbon (TOC), total dissolved solids (TDS), volatile organic compounds (VOCs), and bacterial contamination.

The methods and system disclosed herein will reduce and/or effectively eliminate bacterial contamination, hydrocarbon metals, inorganic contaminants or metal ions, phosphates, VOCs, TSS, TDS and other contaminants from oil and gas wastewater in order to ultimately reduce the water footprint associated crude oil production, and provide the ability to reuse treated produced water as hydraulic fracturing fluid. More specifically, the novel, high-efficiency treatment method and system disclosed herein is extremely and unexpectedly effective in treating highly contaminated produced water by the removal and/or reduction of certain inorganic contaminants such as Ca, Mg, Na, Fe, Cl, Mn, TDS, $CaClO_3$, $SO_4$, Ba, as well as hydrocarbons, biological contamination and other colloidal material. Furthermore through adjustment of physical and chemical process parameters, some contaminants can be selectively targeted at higher removal rates.

Chlorine dioxide's unique chemical and physical properties make it ideal for use in treatment of fracturing fluids. As an oxidant, it is able to penetrate hydrocarbons and break emulsions allowing for the separation and recovery of hydrocarbons, as well as the reduction and/or elimination of biological contamination. Because of its specificity, its oxidation power can be directed at contaminates such as sulfides and residual polymers without creation of undesirable by-products and, unlike bleach or chlorine, chlorine dioxide does not form chlorination by-products that can cause operational or environmental concerns.

Chlorine dioxide (and/or chlorite), however, is heavily regulated and caution is necessary in its generation, handling and storage. Furthermore, it can be very costly depending on the chlorine dioxide demand of the wastewater and/or source water. The various embodiments of the invention use the oxidative power of chlorine dioxide together with oxygen (or air) to achieve unexpected results, unexpected increase in efficiency, and unexpected capacity for treatment for these waters that have not been achieved prior to the disclosure herein.

In addition, and according to some of the various embodiments of the invention, a combination of chlorine dioxide disinfection and oxygenation is used to provide a faster-acting treatment for wastewater. Such methods and systems result in increased chlorine dioxide capacity and increased efficiency in relation to volumes of water treated, which provides for reduced chemical usage, reduced energy, and reduced effluent, which in turn results in a reduced burden on the environment and reduced cost.

In accordance with one or more of these embodiments, the use of chlorine dioxide in a closed loop system to treat tanks storing oilfield wastewater, or produced water, has the unexpected potential to reduce bacterial contamination, Ca, Mg, Na, Fe, Cl, Mn, TDS, $CaClO_3$, $SO_4$, Ba, oil, grease, and combinations thereof, thus providing reduced treatment costs, fluid disposal costs and make-up water purchases (by allowing for greater reuse of the oilfield wastewater as hydraulic fracturing fluid), and reduced environmental and safety concerns. In alternative embodiments, chlorine dioxide can also be used for the pretreatment and disinfection of fracturing fluids prior to their use in crude oil production and/or hydraulic fracturing operations, including but not limited to surface water, produced water, municipal water, flowback water, or any combination thereof.

Accordingly, it is desirable to provide methods and systems for the treatment of wastewater associated with gas and crude oil drilling, pumping and production (i.e. produced water) to alleviate the problems associated with existing treatments. In particular, it is desirable to provide methods and systems for improved treatment of produced water for reuse as fracturing fluids.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY

In one aspect, the invention relates to a method comprising the following steps

Step 1. Produced fluids are transferred into a vessel that allows between 30 minutes and 60 minutes of residence time.

Step 2. Fluid is withdrawn from the first vessel via a pump pass through a venturi and returned to the first treatment vessel. Air is introduced into the venturi to provide for a finely divided and or dissolved airstream returning to the first vessel. Also introduced in the return is a solution of sodium chlorite or a combination of sodium chlorite and sodium hydroxide or those two chemicals as separate feeds. Alternatively, another feedstock can be added to facilitate the precipitation of a target compound. The supply stream is drawn from a level approximately 20% up from the bottom of the vessel. The discharge of the fluid is through a distribution line at the midline of the vessel. The first vessel has provision for skimming of hydrocarbons or other low specific gravity material, and provision for removal of high density solids.

Step 3. Fluid is discharged from the first vessel to the centerline of a second vessel. Chlorine dioxide gas is introduced and the transfer line. Chlorine dioxide dosage is sufficient to achieve a residual in the second vessel.

Step 4. The second vessel has a residence time of approximately 30 to 60 minutes. The second vessel has a underflow to the third vessel. The second vessel has provision for skimming of flocculate material that is of low specific gravity.

Step 5. The third vessel has a residence time of approximately 10 to 30 minutes. This vessel has an overflow to a third vessel or clear well. This vessel also has provision for removal of high density solids from the bottom of the vessel.

GLOSSARY

The following terms as used herein have the following meanings:

Demand or Chlorine Dioxide Demand—The amount of chlorine dioxide (or other oxidant) consumed by background, reactive impurities (both inorganic and organic materials) in a given sample of wastewater (i.e. oilfield water), fracturing fluid, treatment or other target fluids. Chlorine dioxide demand is determined by subtracting the amount of chlorine dioxide remaining after a specified time from the amount of chlorine dioxide initially added to a system.

Free Residual or Residual—The amount of chlorine dioxide (or other oxidant) present at a given time to react with biological species after background contaminants (or "demand") have been converted. In other words, the amount of chlorine dioxide (or other oxidant) available for bacterial control.

Biocide—chemical agent capable of killing living microorganisms, often in a selective way (also referred to as bactericides or antimicrobials).

Biological Contamination—any living microorganism or by-product of a living microorganism found in wastewater (i.e. oilfield water), fracturing fluids, treatment fluids, source water or other target fluids.

Biocidally-Effective Amount—An amount that will control, kill or otherwise reduce the bacterial or microbial content of the wastewater (i.e. oilfield water), fracturing fluids, treatment fluids, source water or other target fluids at issue.

Well Fluid, Fracturing Fluid or Frac Fluid—Any fluid used in any of the drilling, completion, work over and production of subterranean oil and gas wells. It generally includes a source (or raw, or base) water feed (e.g. Frac Water) plus any additives.

Frac Water—Raw water feed used in hydraulic fracturing process from any source, including but not limited to surface water, municipal water or treated flowback or produced water.

Produced Water—Water that is naturally occurring within a subterranean formation that is produced to the surface either as part of a hydraulic fracturing or crude oil operation Flowback Water—Recovered fracturing fluids that flow back to the surface after being pumped down into a subterranean formation as part of a hydraulic fracturing or crude oil operation.

Oilfield Water—As used herein, includes production water, flowback water and other fluids that are the by-products of crude oil production, hydraulic fracturing, or other petroleum production processes.

Furthermore, as used herein, the words "comprise", "has," and "include" and all grammatical variations thereof are each intended to have an open, non-limiting meaning that does not exclude additional elements or parts of an assembly or structural element.

The features of the present invention will be readily apparent to those skilled in the art upon a reading of the description of the embodiments that follows.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DESCRIPTION OF THE ILLUSTRATIVE EMBODIMENTS

Figure 1:
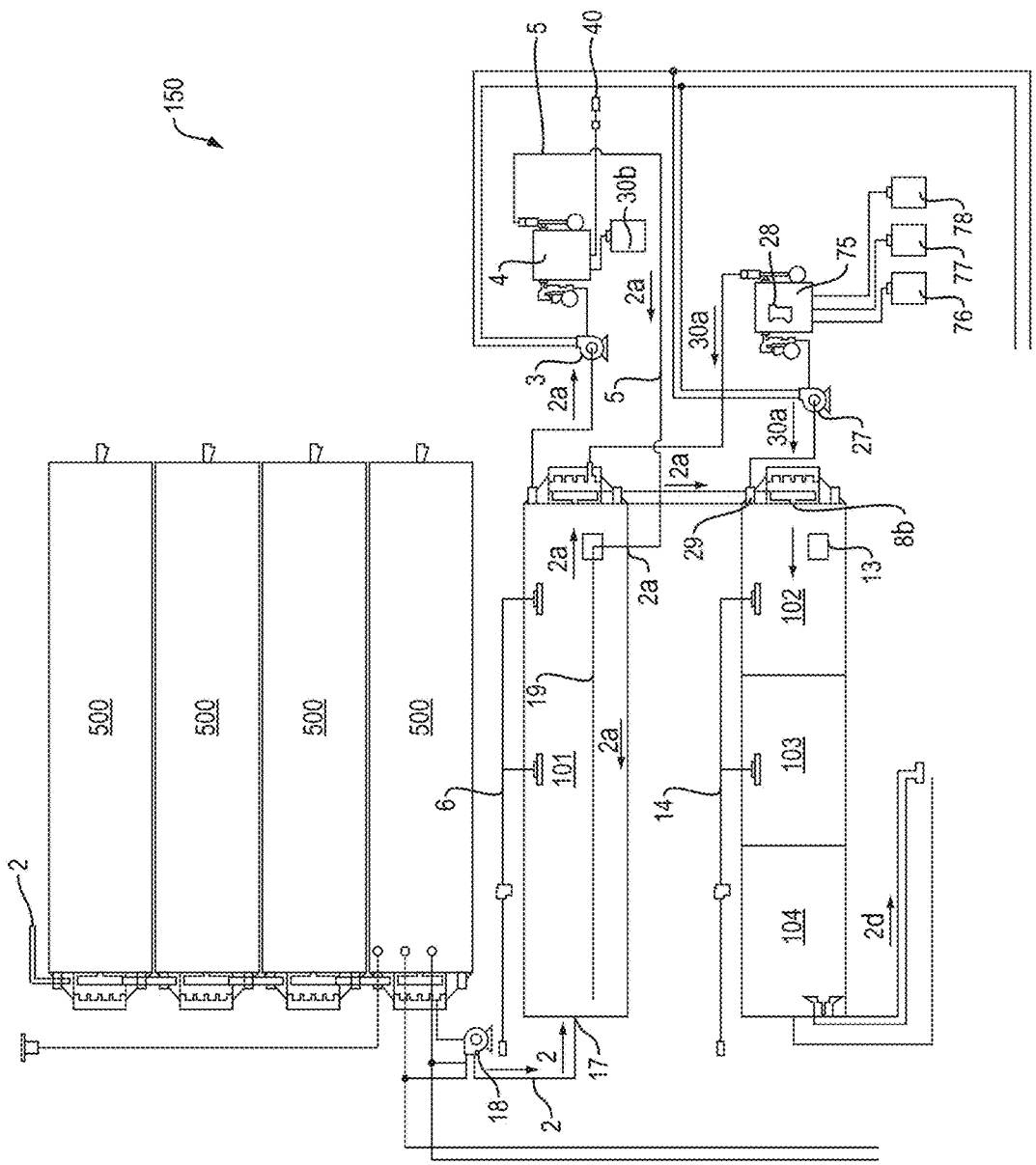
FIG. 1 is a schematic of a typical water treatment system in accordance with an exemplary embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated an protected.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

Hydraulic fracturing and other oil field drilling and production processes require large quantities of water and, in turn, produce large quantities of wastewater. Additionally, many other types of industrial or commercial operations rely on large quantities of water and produce large quantities of wastewater, all of which needs to be treated. These industries include, but are not limited to, agriculture, chemical, pharmaceutical, mining, metal plating, textile, brewing, food and beverage processing, and semiconductor industries. The presence of biological contamination and other organic contaminants results in decreased efficiency and can cause damage (i.e. corrosion, blockages, growth of harmful bacteria). Similarly, waters that have high residual organic or biological contamination are unsuitable for use in oilfield operations and need to be treated prior to being injected underground and introduced into a subterranean formation.

In accordance with the embodiments of the invention, chlorine dioxide can be used to treat oilfield water (including production water, flow-back water and surface water) in order to reduce both the biological load and to aid in the breakdown of residual organic contamination in the water. For example, although not limiting, one or more embodiments of the present invention may be used for the treatment of produced or flowback water prior to disposal or reuse. Both produced and flowback water tend to have substantial biological contamination, as well as a high load of organic contaminants (such petroleum hydrocarbons, oil and grease, diesel-related organics, BTEX), polymers (such as polyacrilamides), iron (Fe), VOCs, inorganic transition metals or metal ions, suspended solids, and other contaminants.

In an exemplary embodiment of the invention, the methods disclosed herein can be used in a continuous, closed-loop system to treat produced or flow-back water before the water is reused in a subsequent hydraulic fracturing operation. However, and still in accordance with the claimed invention, the methods can also be used as a pretreatment for frac water, including but not limited to a pretreatment "on the fly"; before the water is deposited in storage pits/tanks/lagoons; or as part of a wide variety of other oilfield production systems.

For example, one embodiment is a process for treating produced water that provides for a substantial reduction in bacterial contamination, hydrocarbon metals, inorganic contaminants or metal ions, phosphates, volatile organic compounds (VOCs), total dissolved solids (TDS) and other contaminants from oil and gas wastewater as compared to conventional treatment methods, and allows the treated produced water to achieve a final residual of chlorine dioxide in the range of about 0.1 mg/l and 50 mg/l, thus making the treated produced water suitable for re-use, for example, as a hydraulic fracturing fluid without the need for additional treatment technologies (such as RO systems). More specifically, the treatment system and method disclosed herein resulted in the unexpected and commercially unavailable reduction of metal ions including iron, calcium, manganese, magnesium and barium.

In certain embodiments, the amount of chlorine dioxide required to treat the produced water is substantially less than what would be expected by those of ordinary skill in the art and is substantially less as compared to what would be required if one were to use chlorine dioxide in isolation, thus also providing substantial financial and economic benefits for large scale commercial use.

FIG. 1 illustrates one embodiment of a closed loop treatment system 150 in accordance with certain embodiments of the invention. In operation, and as exemplified in FIG. 1, raw produced fluid 2 is transferred into, or enters, a first treatment vessel 101 through treatment system inlet 17, via pump 18. Although not limiting, as shown in FIG. 1, first treatment vessel 101 is a frac tank located onsite at an oil and gas production site. Prior to transfer into first vessel 101, fluid 2 can be stored in one or more storage frac tanks 500 (as shown in FIG. 1). In alternative embodiments, fluid 2 can be transferred directly from, for example, a truck, pipe, pit or well using various transfer methods and apparatus known in the art into first vessel 101.

In exemplary embodiments, although not required, raw produced fluid 2 is a highly contaminated wastewater stream from an oil and gas application containing high levels of contaminants selected from the group consisting of bacterial contamination, Ca, Mg, Na, Fe, Cl, Mn, TDS, $CaClO_3$, $SO_4$, Ba, oil, grease, and combinations thereof. In certain embodiments, fluid 2 undergoes initial hydrocarbon separation techniques prior to being transferred into first treatment vessel 101 using techniques known in the art. Prior to entering vessel 101, fluid 2 (e.g. raw, untreated produced water) has a first initial demand 200, which can be determined using tests known in the art.

For purposes of this disclosure, and referring to FIG. 1, the wastewater to be treated, e.g. produced water, that is contained in vessel 101 is referred to herein as fluid 2a. First treatment vessel 101 provides fluid 2a with a residence time of about 15 minutes to 60 minutes. The total residence time required for fluid 2a will vary and depend on the characteristics of the fluid and other environmental factors. For example, in some embodiments the residency time will be 15, 18, 20, 22, 25, 27, 30, 35, 40, 45, 50, 55 or 60 minutes, including any and all ranges and subranges therein (e.g., 15 to 60 minutes, 18 to 55 minutes, 15 to 30 minutes, 20 to 30 minutes, 15 to 20 minutes, 20 to 25 minutes, 18 to 25 minutes, 25 to 50 minutes, etc.).

Once transferred into vessel 101, fluid 2a then is withdrawn from first vessel 101 via a circulation pump 3, passed through a venturi 4, and returned to first treatment vessel 101. The supply stream for fluid 2a is drawn from a level approximately 20% up from the bottom of first treatment vessel 101, all through transfer, or distribution, line 5. As fluid 2a is passed through venturi 4, oxidant 40, which in the embodiment shown here is air, is introduced into venturi 4 to provide for a finely divided or dissolved stream of air in return fluid 2a as it returns to first vessel 101. Air (or oxidant 40) is introduced at a rate to avoid air stripping so that the removal of volatile reductants (i.e. hydrogen sulfide) is via oxidation, rather than physical purging or stripping. By selecting an air flow rate that prevents or avoids off-gassing of hydrogen sulfide or other volatile compounds present in fluid 2a, the reductants are oxidized in situ rather than purged by allowing the oxidant to come into contact with the sulfides and allow oxidation to occur. In the embodiment disclosed in FIG. 1, oxidant 40 is air. However, in alternative embodiments, oxidant 40 can be oxygen, oxygen-enriched air, or any chemical oxygen source or combination that is stable with chlorite. Although not preferable, if ozone is used, it should not be used in combination with chlorine dioxide in the first step because ozone consumes chlorine dioxide. Furthermore, in alternate embodiments, oxidant 40 can be introduced into fluid 2a via means other than venturi 4, such as an injection boom, pressurized source, aerator, mechanical agitation, air sparger, diffuser, sprayer or other means for injecting and diffusing air known in the art.

The amount of oxidant 40 dosage required will depend on the characteristics of fluid 2 (e.g. initial demand 200), the treatment system, and the intended use or application, together with other considerations known to those of ordinary skill in the art. In exemplary embodiments, oxidant 40 is added at an appropriate dosage and period of time to achieve an overall dosage ranging from about 20 mg/kg to about 2000 mg/kg of oxidant 40 to the total volume of fluid 2a to be treated, with a more preferred dosage of about 20 mg/kg to about 1000 mg/kg of oxidant 40 to the total volume of fluid 2a to be treated.

For example, in some embodiments, the dosage comprises 20, 30, 50, 100, 250, 300, 500, 750, 800, 900, 1,000, 1,250, 1,500, 1,800, 2,000 mg/kg oxidant to the total volume of fluid to be treated, including any and all ranges and subranges therein (e.g., 20 to 2000 mg/kg, 100 to 2000 mg/kg, 300 to 2000 mg/kg, 500 to 2000 mg/kg, 1000 to 2000 mg/kg, 20 to 1000 mg/kg, 50 to 1000 mg/kg, 100 to 1000 mg/kg, 500 to 1000 mg/kg, 20 to 500 mg/kg, etc.).

When fluid 2a is withdrawn from first vessel 101 via a circulation pump 3, and passed through a venturi 4, and before its return to first treatment vessel 101, a solution of sodium chlorite (chlorite 30b) is introduced either at the same time as oxidant 40 or substantially contemporaneously therewith. Alternatively, a combination of sodium chlorite (chlorite 30b) and sodium hydroxide (caustic 90) as a single feed or, alternatively, sodium chlorite (chlorite 30b) and sodium hydroxide (caustic 90) as two separate feeds (not shown), is introduced at the same time as the air, or substantially contemporaneously therewith. In a preferred embodiment, a 25% sodium chlorite solution, commercially available as DiKlor® from Sabre Oxidation Technologies, Inc. is used as chlorite 30b. However, other available sources of chlorite 30b are available and known to those of ordinary skill in the art. In embodiments of the invention, chlorite 30b is added at an appropriate dosage and period of time to achieve a dosage ranging from about 10 mg/l to about 500 mg/l in fluid 2a to be treated. For example, in some embodiments, the chlorite 30b dosage comprises 10, 20, 23, 27, 30, 50, 100, 120, 180, 230, 250, 300, 420, 500 mg/l, including any and all ranges and subranges therein (e.g., 10 to 500 mg/l, 25 to 500 mg/l, 25 to 300 mg/l, 10 to 300 mg/l, 10 to 100 mg/l, 25 to 100 mg/l, 50 to 500 mg/l, 50 to 420 mg/l, 23 to 420 mg/l, 27 to 420 mg/l, 23 to 300 mg/l, 27 to 300 mg/l, 23 to 230 mg/l, etc.).

Referring to FIG. 1, after being dosed with a combination of air, sodium chlorite, and caustic (optional), returned fluid 2a is discharged back into vessel 101 through distribution line 5 and/or other distribution means known in the art for uniformly distributing fluid 2a within first vessel 101. In this particular embodiment, returned fluid 2a is discharged back into vessel 101 at the centerline or midline 8a (half way up the vertical height of fluid volume contained in the vessel), or substantially about the midline, of first vessel 101. A number of different means can be used to distribute fluid 2a during this step, including but not limited to a submergible boom 19 (stationary or movable) with openings for discharging fluid 2a as shown in FIG. 1, or other similar types of sparging or uniform distribution mechanisms known in the art of wastewater treatment.

The continuous circulation, or recycling, of fluid 2a from vessel 101 through venturi 4 and then back into vessel 101 through distribution line 5 allows fluid 2a to be sufficiently diffused with oxidant 40 and chlorite 30b, ultimately insuring that fluid 2a in first treatment vessel 101 will be fully infused with and exposed to oxidant 40 and chlorite 30b, which are distributed substantially equally throughout vessel 101. Notably, and unexpectedly, this first stage, or phase, that combines oxidant 40 and chlorite 30b (and optionally caustic) results in a high reduction in the initial demand 200, or high percentage of contaminant reduction, as compared to oxidation/aeration with only air/oxygen. For example, the reduction of initial demand 200 in treatment vessel 101 can be as much as 70-80% during phase 1 of the disclosed process. In certain embodiments, and as shown in FIG. 1, treatment system 150 can be set up so that chlorine dioxide (30a) can be introduced into fluid 2a instead of, or in combination with, chlorite 30b during Phase 1.

In one or more embodiments, first treatment vessel 101 has skimming means 6 for removing hydrocarbons or other low specific gravity material that has risen to the top of fluid 2a. Skimming means 6 are well known in the art of wastewater treatment, and include oil skimmers, (e.g. a paddle type), conveying belt, dissolved air flotation or other equipment known in the art to remove lighter solids, hydrocarbons or floc from the surface of a treatment tank. In certain embodiments, the amount of hydrocarbon removed at this phase can be in the range of about 1-2% of fluid 2a.

In one or more embodiments, first treatment vessel 101 also has a separation system (or removal means) 7 for removing precipitated or settled high density solids from the bottom of treatment vessel 101. Separation system, or removal means, 7 include mechanical equipment known in the art of wastewater treatment that can removed settled solids from the bottom of a treatment tank, and can include, for example, an auger or scraper mechanism. In one exemplary embodiment, the auger or other scraping mechanism sits at the bottom of the vessel 101, pulls the settled solids to center of the tank, where these is a pit, and the solids are pumped out of vessel 101 through the pit.

In the second phase of the embodiments of the invention claimed herein, and as shown in FIG. 1, using pump 27, treated fluid 2a is pulled or discharged from first treatment vessel 101 to the centerline 8b of a second treatment vessel 102 via transfer line 9. Chlorine dioxide gas is introduced into fluid 2a at injection port 29 via transfer line 9 and prior to distribution into second vessel 102 as fluid 2b. The chlorine dioxide dosage introduced into fluid 2a is sufficient to achieve a chlorine dioxide residual in fluid 2b within second treatment vessel 102 and is dependent on the amount of biological contamination in the fluid. In some embodiments, the chlorine dioxide 30a dosage comprises about 10 mg/l to about 500 mg/l, for example, 10, 20, 25, 47, 50, 100, 120, 150, 210, 230, 250, 300, 335, 350, 400, 500 mg/l, including any and all ranges and subranges therein (e.g., 10 to 500 mg/l, 10 to 335 mg/l, 25 to 500 mg/l, 25 to 335 mg/l, 25 to 230 mg/l, 45 to 335 mg/l, 45 to 500 mg/l, 47 to 335 mg/l, 50 to 400 mg/l, 20 to 230 mg/l, 20 to 47 mg/l, 10 to 50 mg/l, etc.).

In certain embodiments, the amount of biological contamination can be determined or monitored prior to introducing raw fluid 2 into treatment vessel 101, immediately upon withdrawing fluid 2a from treatment vessel 101, or both. For example, one or more samples from frac storage tanks 500, inlet 17, vessel 101, distribution line 5, or some combination of the same, may be removed and tested for microbial contamination. In alternative embodiments, in-line monitoring equipment may be coupled at various places along the treatment system to allow for continuous monitoring of biological contamination. Testing can be accomplished by test known to those skilled in the art for determining biological demand and/or microbial kill.

The target residual concentration of chlorine dioxide in the treated fluid 2b depends on the intended storage period prior to reuse as, for example, a hydraulic fluid. For example, for immediate use as frac water in a hydraulic fracturing system, the desired chlorine dioxide residual of fluid 2b is between about 0.1 mg/l and about 20 mg/l, preferably between about 0.5 mg/l and about 5 mg/l. If, on the other hand, fluid 2b is to be stored for several days or more before being reused as a hydraulic fluid, the target residual concentration of chlorine dioxide should be between about 5 mg/l and about 50 mg/l, preferably between about 20 mg/l and about 50 mg/l. One of ordinary skill in the art can calculate and determine the required target residual, and thus dosage required, depending on the characteristics of fluid 2b, intended storage time, intended use and other factors.

For example, in some embodiments, the target residual comprises 0.1 mg/l, 0.2 mg/l, 0.3 mg/l, 0.5 mg/l, 1.0 mg/l, 1.5 mg/l, 3 mg/l, 5 mg/l, 10 mg/l, 15 mg/l, 20 mg/l, 25 mg/l, 40 mg/1, or 50 mg/l, including any and all ranges and subranges therein (e.g., 0.1 to 50 mg/l, 0.1 to 20 mg/l, 0.1 to 10 mg/l, 0.1 to 5 mg/l, 0.1 to 2 mg/l, 0.5 to 20 mg/l, 0.5 to 10 mg/l, 0.5 to 5 mg/l, 1.0 to 20 mg/l, 1.0 to 10 mg/l, 5 to 10 mg/l, 5 to 40 mg/l, 5 to 50 mg/l, 10 to 50 mg/l, 20 to 50 mg/l, etc.).

Any appropriate method of producing chlorine dioxide known in the art may be used to generate chlorine dioxide suitable for use in the present invention. In general, chlorine dioxide solutions can be produced by treatment of chlorite salt solutions (e.g. $NaCl_{O2}$) with an acid solution to produce acidic solutions that contain $Cl_{O2}$, which can be then be flushed as a gas into water to produce aqueous $Cl_{O2}$. Other precursors such as sodium chlorate can also be used. For example, in a preferred embodiment, the present invention provides a process that comprises producing chlorine dioxide by using an apparatus such as a chlorine dioxide generator, e.g. as disclosed and claimed in U.S. Pat. No. 6,468,479, the disclosure of which is incorporated herein by reference. The chlorine dioxide is generated either directly as a gas, or preferably as an aqueous (or other suitable liquid carrier) chlorine dioxide mixture. The generator is preferably run using an excess of sodium chlorite to reduce the possibility of generating chlorine gas as an impurity.

Referring to FIG. 1, chlorine dioxide generator 75 is placed in line with the treatment system, and the chlorine dioxide precursors (hydrochloric acid, sodium chlorite, and sodium hypochlorite are stored in tanks 76, 77 and 78, respectively. Venturi 28 has a water stream flowing there through which establishes a vacuum and draws the chlorine dioxide from the reaction column of the generator into the water stream to form aqueous chlorine dioxide.

In an exemplary embodiment, second treatment vessel 102 has a residence time for fluid 2b of approximately 10 to 30 minutes, although reaction time will vary depending on the nature of fluid 2b. For example, in some embodiments the residency time will be 10, 13, 15, 18, 20, 22, 25, 27 or 30 minutes, including any and all ranges and subranges therein (e.g., 10 to 30 minutes, 12 to 30 minutes, 15 to 30 minutes, 20 to 30 minutes, 10 to 20 minutes, 10 to 25 minutes, 15 to 25 minutes, etc.). Second vessel 102 has underflow means 13 to a third treatment vessel 103. Underflow means 13 can include a conduit, pipe, transfer line, or any other means for allowing fluid 2b located at the bottom of vessel 102 to flow into vessel 103 that are well known in the art for wastewater treatment systems. In an exemplary embodiment, second vessel 102 also comprises skimming means 14 to remove light flocculate material, or other materials with low specific gravity, off the surface or top of second treatment vessel 102. As used herein, examples of skimming means 14 are well known in the art and may include, for example oil skimmers, (e.g. a paddle type), conveying belt, dissolved air flotation or other equipment known in the art to remove lighter solids, hydrocarbons or floc from the surface of a treatment tank.

Third treatment vessel 103 contains fluid 2c. Vessel 103 has a residence time of approximately 10 to 30 minutes, although reaction time will vary depending on the nature of fluid 2c. For example, in some embodiments the residency time will be 10, 13, 15, 18, 20, 22, 25, 27 or 30 minutes, including any and all ranges and subranges therein (e.g., 10 to 30 minutes, 12 to 30 minutes, 15 to 30 minutes, 20 to 30 minutes, 10 to 20 minutes, 10 to 25 minutes, 15 to 25 minutes, etc.).

Third vessel 103 has overflow means 15 (not shown) to a fourth vessel 104 or clear well. As used herein, examples of overflow means 15 are well known in the art and may include, for example, a conduit, pipe, transfer line, or any other means for allowing fluid 2c to flow from the top of vessel 103 into vessel 104 that are well known in the art for wastewater treatment systems. Third vessel 103 also has means for removal of high density solids from treated fluid 2d from the bottom of vessels 103, examples of which are well known in the art and may include, for example, scrapers or augers at the bottom of the tank.

Figure 2:
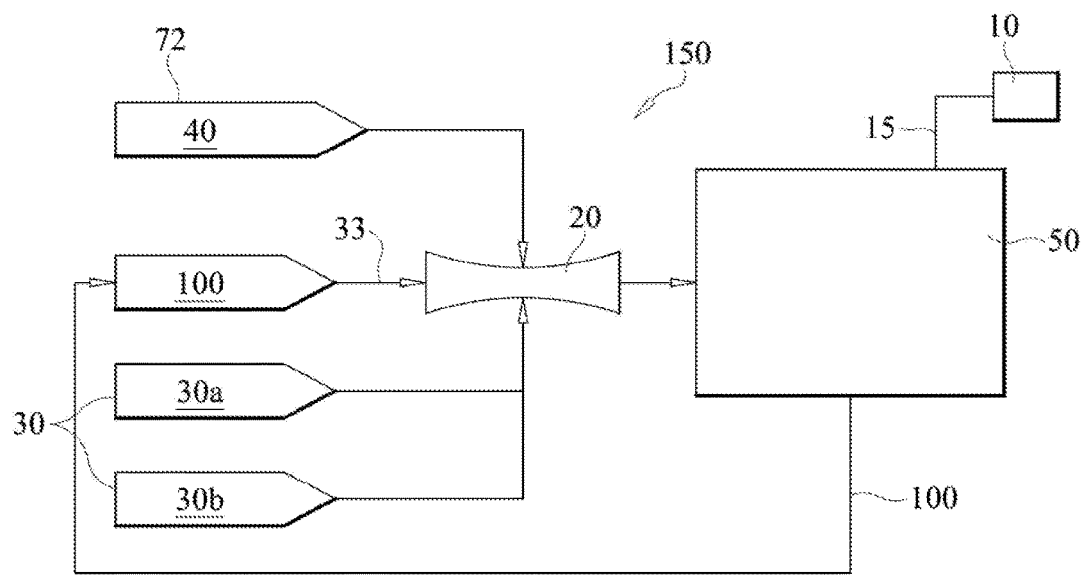
FIG. 2 is a schematic diagram illustrating another embodiment of the invention.

In the embodiment shown in FIG. 1, treatment vessels 101-104 are frac tanks located on site at a oil and gas production site, and the disclosed and claimed produced water treatment system is integrated with a closed loop system already in place at the site. In alternate embodiments, the above method and system can be modified yet still fall within and be consistent within the invention disclosed herein. For example and more generally, in alternate embodiments exemplified generally in FIG. 2, a closed loop treatment system 150 in accordance with the claims of the invention is shown. In FIG. 2, closed loop treatment system 150 comprises a venturi 20, a fluid stream 100 (e.g. wastewater 15) to be treated, treatment/storage vessel or system 50, chlorine oxide 30 and oxidant 40.

Fluid stream 100 comprises wastewater 15, for example, a wastewater fluid stream from an oil and gas site. For example, in FIG. 1, wastewater 15 is raw produced water 2. A combination of a chlorine oxide 30 and an oxidant 40 is introduced into a fluid stream 100. Chlorine oxide 30 preferably comprises chlorite (30b), but it can also include chlorine dioxide (30a), or a combination of chlorite (30b) and chlorine dioxide (30a), which are introduced into stream 100. For example, as was disclosed in connection with FIG. 1, sodium chlorite (i.e. chlorite 30b) can be introduced via eduction using a venturi 20 (or venturi 4, if referring to FIG. 1, wherein venturi 20 is part of fluid stream 100 being treated, or other means well known in the art. In alternate embodiments, one of ordinary skill in the art could use techniques known in the art for introducing, mixing and/or diffusing chemicals within a treatment system, either directly in the tank or in a fluid flow line, including but not limited to inductor pumps, high pressure injectors, pumps, flow lines, conduits, mixers, spargers or a combination of the same.

In exemplary embodiments, oxidant 40 can be air, oxygen, oxygen-enriched air, or any chemical oxygen source or combination that is stable with chlorine dioxide (30a) and/or chlorite (30b), or some combination of the same. And, in one or more embodiments of the invention, oxidant 40 is introduced via direct injection into the wastewater in fine bubbles (i.e. air sparging, a pressurized source, an aerator, mechanical agitation, a diffuser, spraying, or eduction via venturi 20 (4, 28) (see, e.g., FIGS. 1-9). If ozone is used as oxidant 40, it should not be used in combination with chlorine dioxide in the first step because ozone consumes chlorine dioxide. Rather, chlorine dioxide should only be used in the second phase, or step, and only after the ozone residual in the waste water, or aqueous volume, is depleted or close to depletion.

In accordance with exemplary embodiments of the invention as applied to the oilfield and fraccing industry, storage/treatment vessel (or system) 50 contains wastewater 15, which is supplied by a source 10. Source 10 comprises a source of produced water. In alternate embodiments, source 10 comprises flowback water, surface water, municipal water, frac water, wastewater, or any combination thereof. One of ordinary skill in the art will also recognize that wastewater 15 can be any water or target aqueous fluid that is contaminated (for example, with organics and/or microorganisms) and is being recycled or treated for reuse, storage and/or discharge back into the environment, regardless of industry. In one or more embodiments, the oxidant demand of the contaminants in wastewater 15, prior to treatment, is from about 30 mg/l to about 5000 mg/l, preferably from about 50 mg/l to about 500 mg/l. The oxidant demand comprises reducing agents including, but not limited to, reduced sulfur compounds, biomass and other biological by-products, and reduced metals including but not limited to iron (Fe) II.

For example, in some embodiments, the oxidant demand comprises 30, 50, 100, 250, 300, 500, 750, 800, 900, 1,000, 1,250, 1,500, 2,000, 3,000, 4,000, and 5,000 mg/l, including any and all ranges and subranges therein (e.g., 30 to 5000 mg/l, 100 to 2000 mg/l, 300 to 2000 mg/l, 500 to 2000 mg/l, 1000 to 2000 mg/l, 30 to 1000 mg/l, 50 to 1000 mg/l, 100 to 1000 mg/l, 500 to 5000 mg/l, 50 to 500 mg/l, etc.).

In certain embodiments, venturi 20 is used to both generate and introduce chlorine oxide 30 (i.e. chlorine dioxide (30a), and/or a combination of chlorine dioxide (30a) and chlorite (30b)) into fluid stream 100 and, additionally, to then introduce oxidant 40. In other embodiments, separate venturis are used (e.g. venturi 4 & 28 in FIG. 1). In a preferred embodiment, a drive fluid 33 for venturi 20 comes directly from storage vessel 50. Vessel 50 contains wastewater 15, i.e. the wastewater to be treated, or a combination of treated wastewater (or other target fluid) and the wastewater to be treated. One of ordinary skill in the art will recognize, however, that drive fluid 33 can come from any available water source placed in line with system 150.

As shown in FIGS. 2-8, storage/treatment system 50 comprises a single tank or vessel. However, in accordance with the invention, vessel system 50 comprises multiple tanks, pits or ponds, or any other storage means (e.g. reservoir, container, or lagoon) that stores, holds, transports or contains wastewater 15 from source 10. Vessel system 50 may comprise one or more treatment tanks, vessels, containers or other wastewater treatment systems suitable for treating wastewater 15. For example, as described in connection with FIG. 1, vessel 50 actually comprises four treatment vessels 101-104 and storage tanks 500.

In embodiments of the invention, chlorine oxide 30 and oxidant 40 are applied at such a rate that the removal of volatile reductants (i.e. hydrogen sulfide) is via oxidation, rather than physical purging or stripping. By selecting an air flow rate that prevents or avoids off-gassing of the hydrogen sulfide (or other volatile reductants) present in wastewater 15, the reductants are oxidized in situ rather than purged. The goal is to add oxidant 40 to the fluid at a flow rate that brings it into contact with the sulfides to allow oxidation to occur. Thus, a flow rate that results in the addition of air being violent, and thus stripping the sulfides before they can oxidize, should be avoided. The volume of fluid to be treated in vessel system 50 will directly affect the range of flow rates that can be used to avoid off-gassing/purging and, thus, the appropriate range is widespread. For example, a small tank would require a much lower air flow rate than a deep pond. However, one of ordinary skill in the art will be able to determine the appropriate flow rate to avoid purging, or stripping, of the volatiles, depending on the volume, depth and/or size of vessel system 50 (or fluid to be treated), the treatment system as a whole, and oxidant demand.

Figure 3:
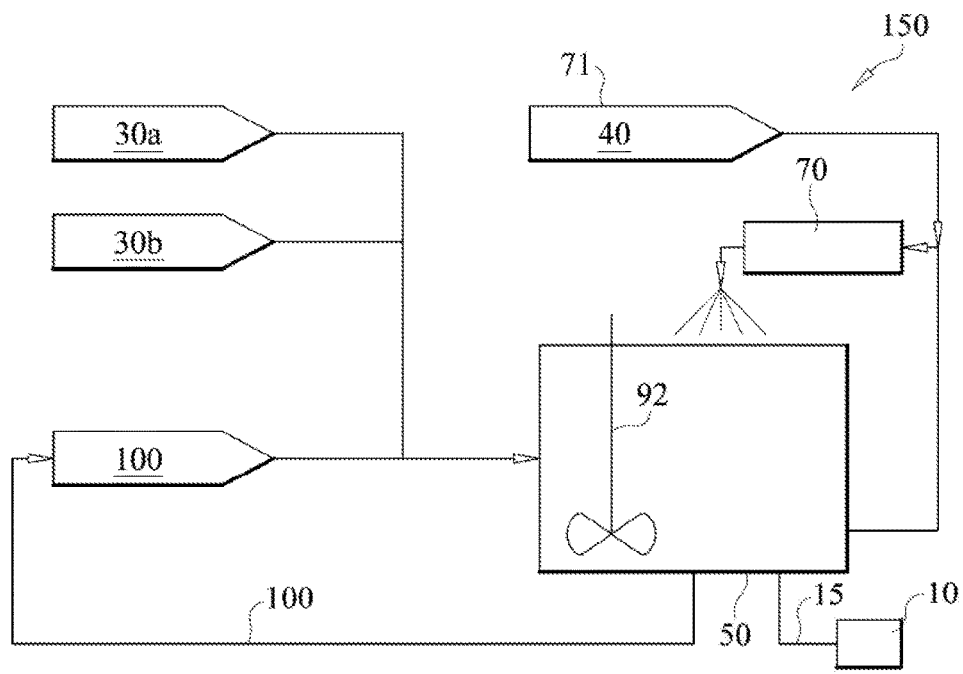
FIG. 3 is a schematic diagram illustrating yet another embodiment of the invention.
Figure 4:
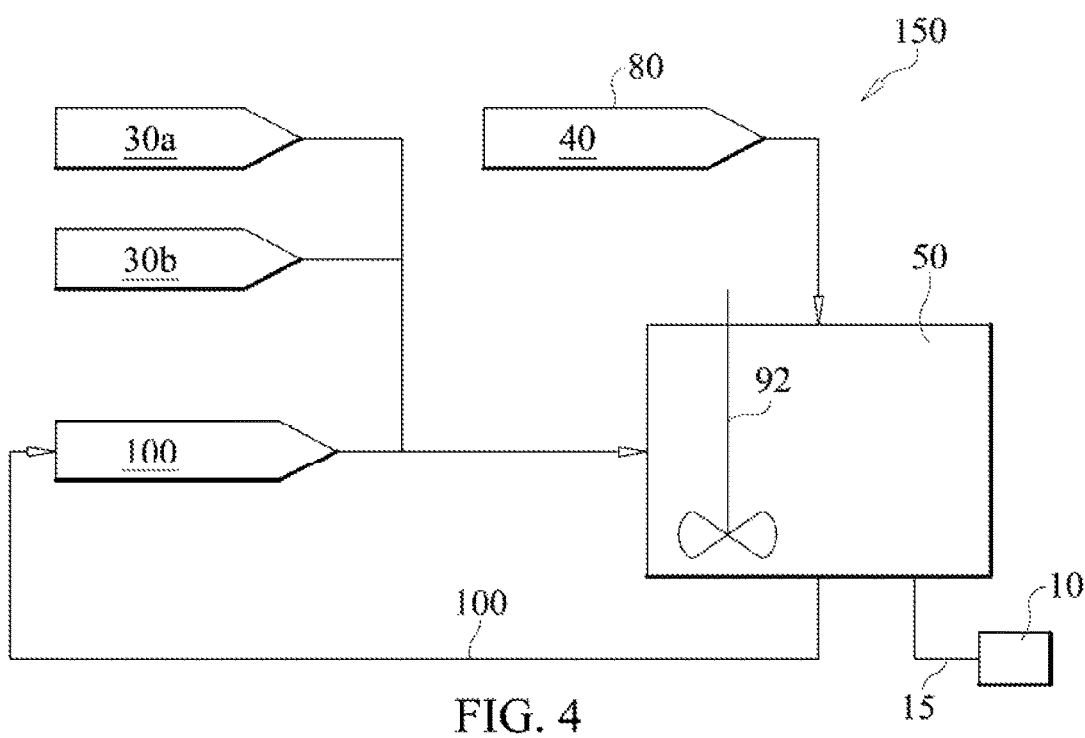
FIG. 4 is a schematic diagram illustrating yet another embodiment of the invention.

In FIG. 3, a diffuser 70 is used to introduce oxidant 40. In one or embodiments, and as shown in FIG. 4, oxidant 40 is added directly to wastewater 15 via a pressurized source 80 near the bottom of vessel 50 and mechanical action can thereby be used to enhance mixing of wastewater 15 within vessel 50. If a single point introduction method is used, it is preferred that the injector be movable throughout the horizontal plane of vessel 50 (not shown).

In one or more of the embodiments disclosed herein, chlorine oxide 30 and oxidant 40 are introduced into wastewater 15 as follows. Initially, chlorine oxide 30 is introduced for a sufficient amount of time and at a sufficient dosage to reduce the chlorine dioxide demand of the wastewater 15 in the range of about 10 percent to about 20 percent, including all ranges and subranges therein (e.g. 12 percent, 15 percent, etc). The amount of time and dosage required will depend on the characteristics of wastewater 15 (e.g. chlorine dioxide demand), the treatment system, and the intended use or application. In one or more embodiments, during this initial (or first) stage of treatment, chlorine oxide 30 comprises chlorite (30b) only. In embodiments where chlorine oxide 30 comprises chlorite (30b) only, the step of introducing oxidant 40 may be (and, in many instances, is preferred to be) performed soon after, simultaneously, substantially simultaneously, or substantially contemporaneously therewith (See, e.g. FIG. 1, description for FIG. 1 and examples herein). In embodiments of the invention, chlorite 30b is added at an appropriate dosage and period of time to achieve a dosage ranging from about 10 mg/l to about 500 mg/l in fluid 2a to be treated. For example, in some embodiments, the chlorite 30b dosage comprises 10, 20, 23, 27, 30, 50, 100, 120, 180, 230, 250, 300, 420, 500 mg/l, including any and all ranges and subranges therein (e.g., 10 to 500 mg/l, 25 to 500 mg/l, 25 to 300 mg/l, 10 to 300 mg/l, 10 to 100 mg/l, 25 to 200 mg/l, 50 to 500 mg/l, 50 to 420 mg/l, 23 to 420 mg/l, 27 to 420 mg/l, 23 to 300 mg/l, 27 to 300 mg/l, 23 to 230 mg/l, etc.).

In alternate embodiments, chlorine oxide 30 may be chlorine dioxide (30a), chlorite (30b) or a combination thereof. Because chlorine dioxide reacts as a free radical and, therefore, reacts almost instantaneously, chlorine dioxide cannot be added at high rates or concentrations at the same time as when a large volume of oxidant 40 is being added. Therefore, if chlorine oxide 30 comprises chlorine dioxide (30a) during this initial step (or a combination of chlorite (30b) and chlorine dioxide (30a)), oxidant 40 cannot be added at the same time until all of the chlorine dioxide (30a) has converted to chlorite (30b) or, if performed simultaneously, oxidant 40 must be added at a rate low enough to make sure any chlorine dioxide is not stripped, or purged, from wastewater 15 before it disperses through the fluid body.

Furthermore, in certain embodiments, caustic 90 (not shown) can be added either prior to treatment with chlorine oxide 30, or concurrently therewith, to raise the pH of wastewater 15 to about 7-10. For example, in the embodiment described with FIG. 1, sodium hydroxide (caustic 90) is added to achieve a pH of about 8.5. By introducing a higher pH for wastewater 15, contaminant metals (for example, iron (Fe)) will drop out of solution and the formation of certain metal complexes that tend to form in low pH will be avoided. In still other embodiments anticipated within the scope of this invention, the first step of adding chlorine oxide 30 can be skipped, depending on the chlorine dioxide demand and the application/system at hand.

Oxidant 40 is introduced into wastewater 15 either prior to treatment with chlorine oxide 30, or substantially concurrently therewith. Oxidant 40 is added at an appropriate dosage and period of time to achieve an overall dosage ranging from about 20 mg/kg to about 2000 mg/kg of oxidant 40 to the total volume of wastewater 15 to be treated, including all ranges and subranges therein, with a more preferred dosage of about 20 mg/kg to about 1000 mg/kg of oxidant 40 to the total volume of fluid to be treated. Again, the amount of time and dosage required will depend on the characteristics of wastewater 15 (e.g. chlorine dioxide demand), the treatment system, and the intended use or application, together with other mechanical considerations known to those of ordinary skill in the art. In one or more embodiments, the application of oxidant 40 consumes, in total, from about 10 percent to about 90 percent of the total chlorine dioxide demand, preferably from about 60 percent to about 90 percent of the chlorine dioxide demand. For example, in some embodiments the oxidant will consume 10, 20, 25, 40, 50, 60, 65, 70, 80, or 90 percent of the chlorine dioxide demand, including any and all ranges and subranges therein (e.g., 10 to 25 percent, 10 to 70 percent, 15 to 90 percent, 20 to 80 percent, 50 to 85 percent, 60 to 80 percent, 60 to 90 percent, etc.).

The step of introducing oxidant 40 can be performed substantially contemporaneous with, simultaneously with, or immediate after the first step of adding chlorine oxide 30, in particular when chlorine oxide 30 is chlorite (30b) only, during the first treatment step. As discussed earlier, the synergistic impact of oxidant and chlorine oxide can reduce the initial demand by as much as 70-80%, or more.

In the next (or second treatment) step, chlorine oxide 30 is introduced at a dosage sufficient to achieve a target ClO2 residual in the fluid, which is based upon the oxidant demand in the fluid. In FIG. 1, for example, after sodium chlorite, air, and caustic are introduced in Step 1 of the treatment process into treatment vessel 101 for a period of time (i.e. about 15 to about 60 minutes), chlorine dioxide is introduced in the second step into second treatment vessel 102 until a target residual of chlorine dioxide is reached. However, in alternative embodiments, during this second step chlorine oxide 30 may comprise one or more of chlorine dioxide (30a), chlorite (30b) or a combination thereof. It can be, but does not have to be, the same chlorine oxide that was used in the first initial step.

Figure 6:
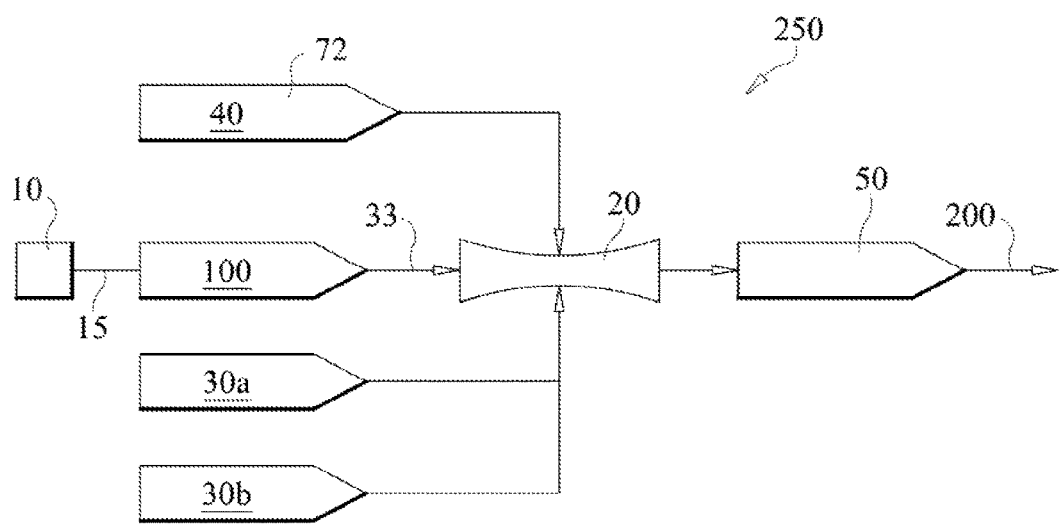
FIG. 6 is a schematic diagram illustrating yet another embodiment of the invention.
Figure 7:
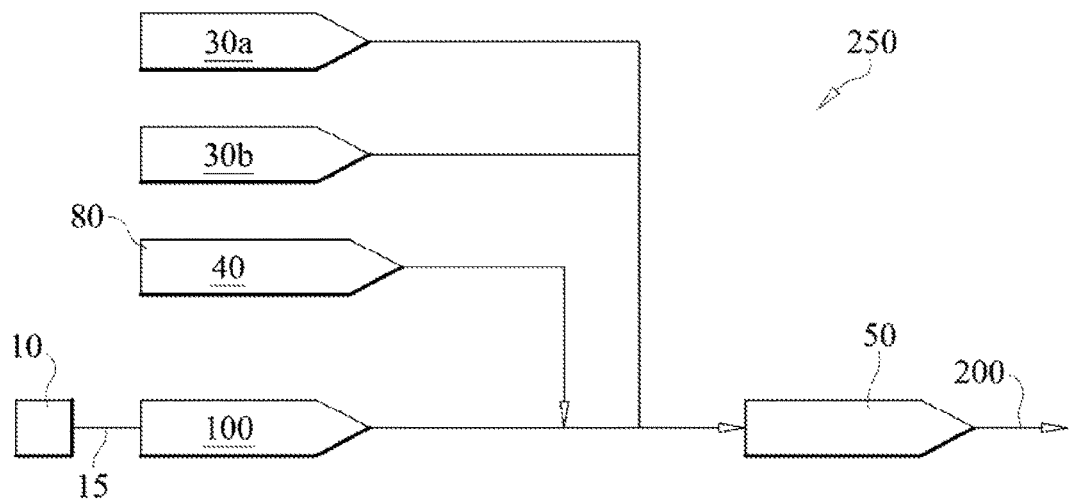
FIG. 7 is a schematic diagram illustrating yet another embodiment of the invention.
Figure 8:
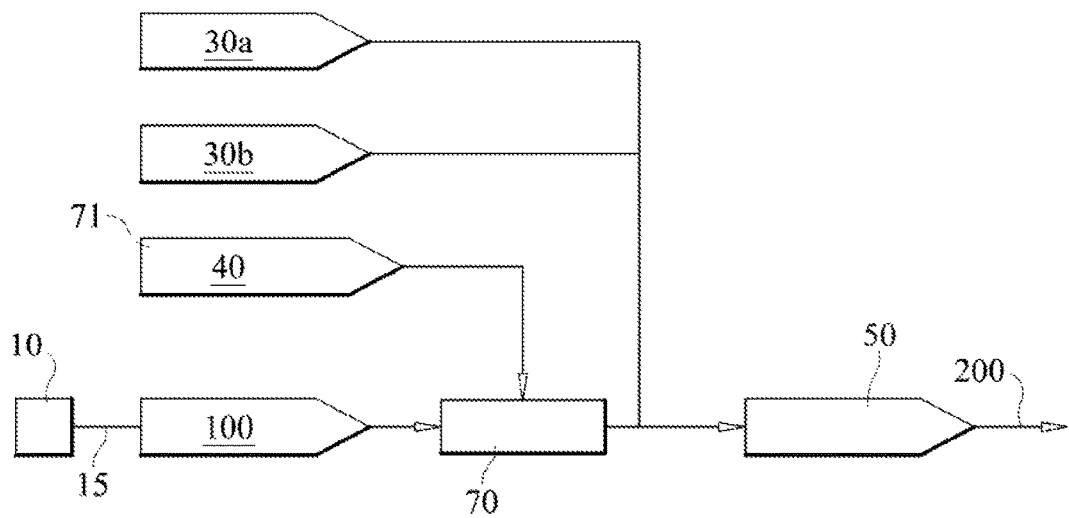
FIG. 8 is a schematic diagram illustrating yet another embodiment of the invention.
Figure 9:
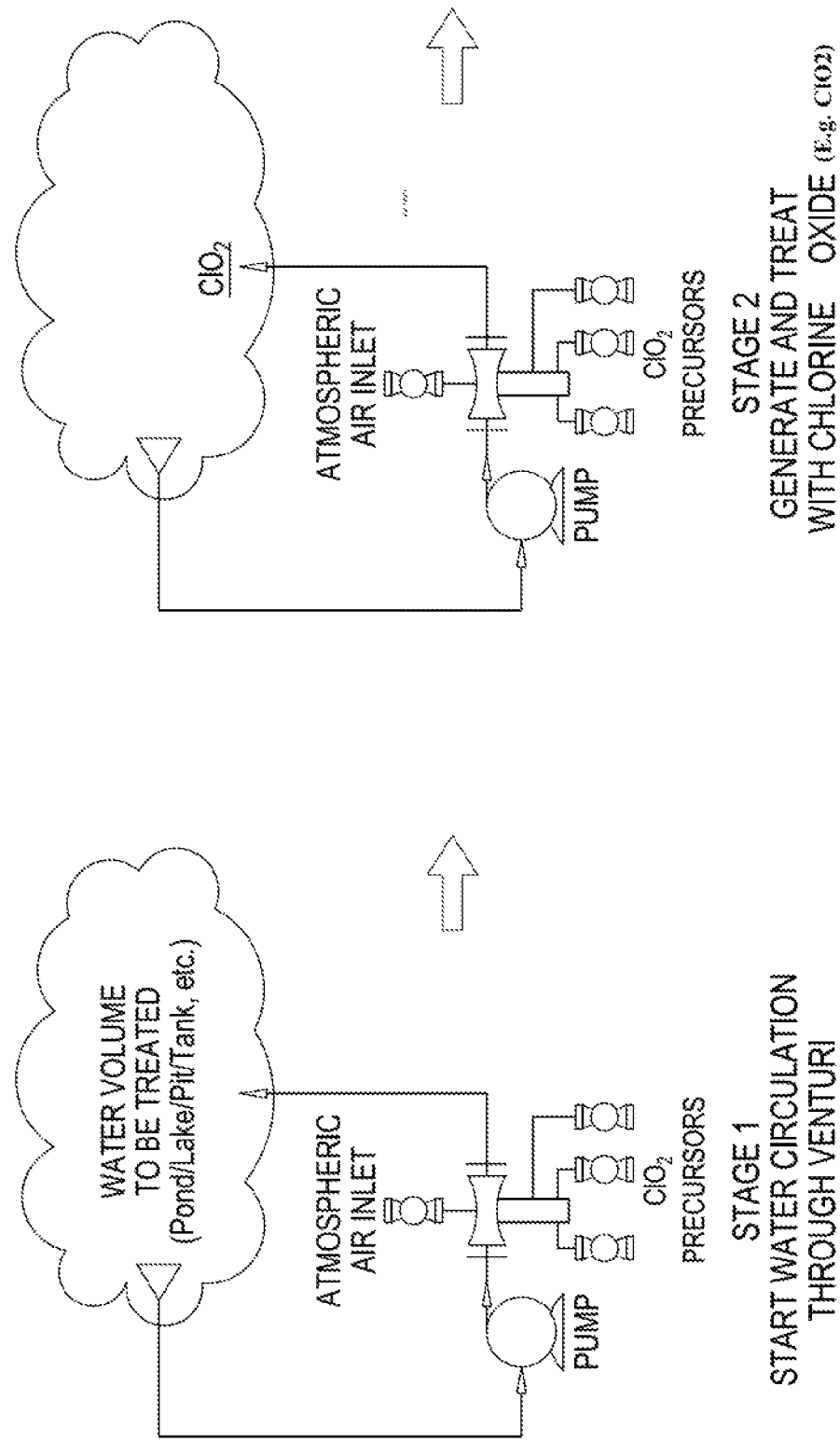
FIG. 9 is an illustration of one embodiment of the invention.

The target residual concentration of chlorine dioxide in the treated fluid or wastewater depends on the intended storage period prior to reuse as, for example, a hydraulic fluid. For example (and as shown in FIGS. 7-9), for immediate use as frac water in a hydraulic fracturing system, the desired chlorine dioxide residual of fluid 200 exiting the system is between about 0.1 mg/l and about 20 mg/l, preferably between about 0.5 mg/l and about 5 mg/l, and including any and all ranges and subranges therein (See ¶¶ 64-65). By way of further example (see, e.g. FIGS. 2-6), if the treated fluid is to be stored in vessel 50 for several days or more, the target residual concentration of chlorine dioxide should be between about 5 mg/l and about 50 mg/l, preferably between about 20 mg/l and about 50 mg/l, and including any and all ranges and subranges therein (See ¶¶ 64-65). As discussed above, in exemplary embodiments, chlorine oxide 30 comprises only chlorine dioxide (30a) during the last stage of the treatment process. During this treatment step, chlorine oxide 30 (in the form of chlorine dioxide (30a)) and oxidant 40 cannot be added to stream 100 at the same time.

In one or more embodiments of the invention, the total treatment time required for wastewater 15 to achieve oxidation and/or disinfection is less than 24 hours, preferably less than 8 hours, if storage/treatment system or vessel 50 comprises a tank, pit, pond, or lagoon. In still other embodiments, the total treatment time required for wastewater 15 to achieve oxidation and/or disinfection is less than about 60 minutes, and preferably less than about 15 minutes, if system/vessel 50 is a pipeline, or a combination pipeline and a tank, such as would be used for "on the fly" operations out in the field (see, e.g., FIGS. 1, 6-8), when there is a limited residency time and treated fluid 200 is to be used immediately.

Figure 5:
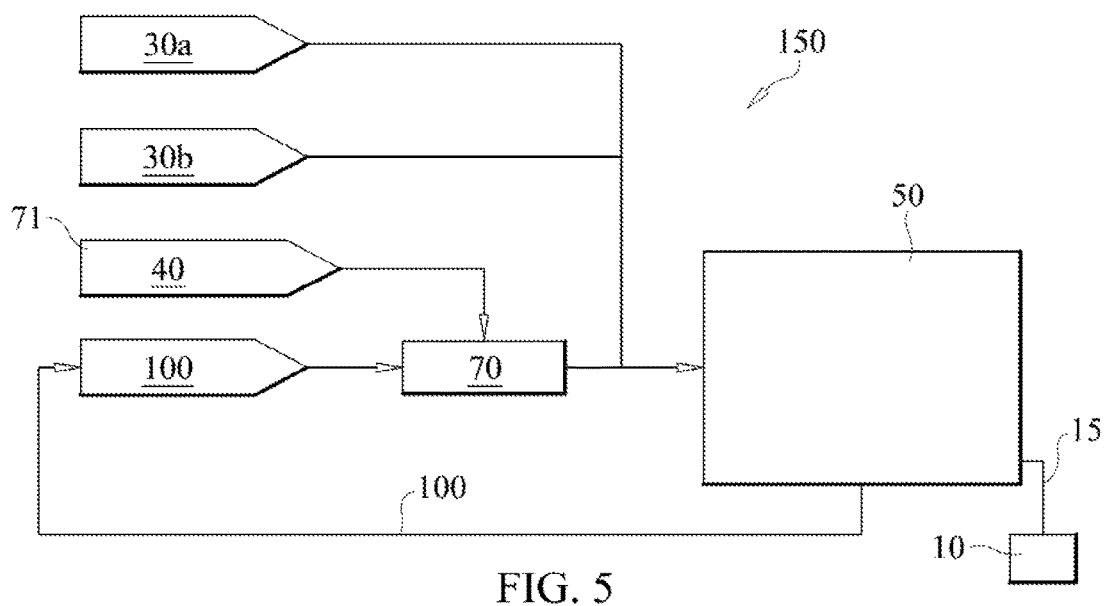
FIG. 5 is a schematic diagram illustrating yet another embodiment of the invention.

Referring to the embodiments shown in FIGS. 2-5, various embodiments of treatment system 150 are shown. In FIG. 3, air injection is used to introduce oxidant 40 into vessel 50 via diffuser 70 and a pressurized source 71. In FIG. 4, a chemical tank and pressurized source 80 is used to introduce oxidant 40. In FIG. 5, diffuser 70 and pressurized source 71, placed in-line, are used to introduce oxidant 40 into stream 100. In certain embodiments, mechanical agitator 92 is used. Referring to the embodiments shown in FIGS. 6-8 (and also FIG. 1), various embodiments of treatment system 250 are shown. Specifically, in these embodiments, treatment system 150 comprises an "in-line" treatment system 250, for example, a frac-on-the-fly treatment system or any other industrial water treatment system that is placed in-line for immediate use. In FIG. 6, oxidant 40 is introduced in-line via venturi 20 from chemical source 72. In FIG. 7, a chemical tank 80 is used in-line to introduce oxidant 40 into stream 100. In FIG. 8, air injection is used to introduce oxidant 40 into stream 100 via diffuser 70 and a pressurized source 71. Although not shown, treatment system 150/250 may also include a source, a means for introducing, caustic 90 as well as other wastewater treatment methods known in the art, such as mechanical agitators, overflow systems, defoaming agents, and electronic sensors and monitoring devices.

As discussed above, any appropriate method of producing chlorine dioxide known in the art may be used to generate chlorine dioxide suitable for use in the present invention. In general, chlorine dioxide solutions can be produced by treatment of chlorite salt solutions (e.g. $NaClO_2$) with an acid solution to produce acidic solutions that contain $ClO_2$, which can be then be flushed as a gas into water to produce aqueous $ClO_2$. Other precursors such as sodium chlorate can also be used.

Several chemical means of generating chlorine dioxide and their corresponding chlorine dioxide precursor chemicals are known in the art, and the choice of suitable means and chemicals is within the abilities of those skilled in the art. Exemplary chemical means of generating chlorine dioxide are disclosed in U.S. Pat. No. 4,689,169 (Mason et al.), U.S. Pat. No. 5,204,081 (Mason et al.), U.S. Pat. No. 5,227,306 (Eltomi et al.), U.S. Pat. No. 5,258,171 (Eltomi et al.), U.S. Pat. No. 5,965,004 (Cowley et al.), and U.S. Pat. No. 6,645,457 (Mason et al.) the disclosures of which are incorporated herein by reference.

In preferred embodiments, the chlorine dioxide should be of the highest possible purity. More specifically, chlorine gas should be present in the introduced chlorine dioxide gas at a level less than about 5%, preferably less than about 0.5%. For example, in a preferred embodiment, the present invention provides a process that comprises producing chlorine dioxide by using an apparatus such as a chlorine dioxide generator, e.g. as disclosed and claimed in U.S. Pat. No. 6,468,479, the disclosure of which is incorporated herein by reference. The chlorine dioxide is generated either directly as a gas, or preferably as an aqueous (or other suitable liquid carrier) chlorine dioxide mixture. The generator is preferably run using an excess of sodium chlorite to reduce the possibility of generating chlorine gas as an impurity. Other generally accepted methods for generating chlorine dioxide can be found in, for example, U.S. Patent Pub. No. 2006/0068029 (U.S. patent application Ser. No. 11/131,021), the disclosure of which is incorporated herein by reference. Furthermore, the generator preferably uses wastewater 15 as the drive fluid for generating chlorine dioxide and brings chlorine dioxide gas into contact with wastewater 15 under a vacuum pressure such that the chlorine dioxide gas is drawn into wastewater 15 to form a chlorine dioxide aqueous solution.

In certain embodiments, the fluid to be treated is circulated through a closed-loop system and treated in situ in accordance with the methods and systems disclosed herein, in repetition, until the contaminants are oxidized and the appropriate residual of chlorine dioxide is achieved prior to discharge from system 150. In still other embodiments, after treatment with chlorine oxide 30 and second oxidant 40, the treated fluids are allowed to stand in vessel 50 for an appropriate period of time to allow the solids to settle and free oil to be skimmed prior to reuse or discharge using wastewater treatment methods known in the art. In still other embodiments, the fluid treated is used (or reused) immediately after treatment for subsequent crude oil, hydraulic fracturing, or other industrial applications. FIG. 9 is an schematic illustration of another embodiment of the invention.

It should be understood that the treatment system and method disclosed herein may be coupled, upstream or downstream, to treatment units or systems already in place for treating or transferring produced water. For example, the treatment system claimed herein can be added into a system already located at an oil and gas production site. Additionally, in exemplary embodiments and referring to FIG. 1 as one example, the concentration of biological contaminants, particulate size, volatile compounds, TDS, and inorganics may be monitored as the treated fluid 2d exits vessel 104 and/or the treatment system. Monitoring can be continuous or periodic. If the fluid exiting the treatment system is not within a predetermined acceptable range, the fluid may be recycled back into the treatment system and/or the amount of oxidant and/or chlorine dioxide introduced into the treatment system may be modified. Similarly, in some embodiments, all or a portion of the stream flowing out of the treatment system may be recycled through the treatment system via one or more recycle lines (not shown). Recycling the fluid stream through the system for a number of passes may allow for significant reduction of the concentration of contaminants. Referring again to FIG. 1 as one example, in some embodiments a portion of the stream exiting the system may be mixed with a portion of the stream entering the treatment system inlet 17.

Although the Examples and descriptions above discuss what is, in essence, a closed loop treatment system, the systems and methods disclosed herein and claimed could also be utilized for a frac "on the fly" system and method, wherein the treated water would be used immediately and/or shortly after being treated for fracturing (See FIGS. 6-8). For example, in one embodiment, the frac water to be injected into the subterranean formation would be treated using the methods disclosed herein out in the oilfield, ahead of the well head. For this system, you would continuously be filling vessel 50 (e.g. onsite frac tanks, located at the frac site/oilfield) with source water that needs to be treated prior to introduction into the well. The water could comprise surface water, municipal water, produced water, flow back water, or any combination of the above ("commingled water").

Furthermore, in alternative embodiments of the invention, the system or process disclosed herein may be combined with one or more traditional or nontraditional biocides, either oxidizing or non-oxidizing, to achieve a synergistic biocidal effect. Additionally, in alternative embodiments, one of ordinary skill in the art will readily appreciate that additional treatment processes known in the art can be incorporated in line or elsewhere in the system (either prior to treatment in accordance with this invention, or subsequent thereto) in either batch or continuous operation. By way of example only, and not meant to be limiting, treatment processes to remove oil and/or solids can be incorporated into the system, or if foaming occurs, one might incorporate a chlorine dioxide compatible defoamer. Similarly, in certain embodiments, the method and system disclosed herein can be added to, or retrofitted into, a preexisting recycling or treatment system, and it can be conducted continuously in-line or in selected quantities in a batch process. One of ordinary skill in the art will also readily appreciate that in one or more embodiments, appropriate measurement and monitoring apparatus and/or equipment may be incorporated into the method and system disclosed herein.

In the embodiments disclosed herein, one of ordinary skill in the art will appreciate that chlorine dioxide residual can be determined and/or calculated using Method 4500-ClO2 E Amperometric Method II described in *Standard Methods the Analysis of Water and Wastewater*, or via modified versions of the same, wherein Standard Method 4500-ClO2 E Amperometric Method II uses the following calculations:

$$ClO_2 \text{ (mg/L)} = 1.25 \times (B-D) \times 0.00564 \times 13{,}490/200$$

$$\text{Chlorite (mg/L)} = D \times 0.00564 \times 16{,}863/200$$

$$\text{Chlorine (mg/L)} = [A-(B-D)/4] \times 0.00564 \times 35{,}453/200,$$

where Titration A titrates the chlorine and one-fifth of the available chlorine dioxide, Titration B titrates four-fifths of the chlorine dioxide and chlorite, Titration C titrates the non-volatilized chlorine (nitrogen gas purges the sample of the chlorine dioxide), but is not used in any calculation, and Titration D titrates the chlorite. In still other embodiments, chlorine dioxide residual can be determined spectrometrically or by measurement of oxidation reduction potential (ORP), each of which are incorporated herein, or via modified versions of the same.

CLAUSES

Embodiments of the present invention, include but are not limited to, the following:

1. A method for treating an aqueous system, comprising:
   providing an aqueous fluid volume having an initial oxidant demand;
   introducing an oxidant into the aqueous volume at a flow rate that avoids off-gassing of volatile reductants from the aqueous volume, wherein said oxidant is selected from oxygen, air, oxygen-enriched air, and a combination of the same;
   combining the aqueous volume and oxidant for a minimum residence time sufficient to lower the initial oxidant demand to a reduced oxidant demand;
   providing at least one chlorine oxide; and
   combining the aqueous volume and a quantity of at least one chlorine oxide in an amount sufficient to eliminate the reduced oxidant demand, wherein said at least one chlorine oxide is selected from chlorine dioxide, chlorite, and a combination of the same.

2. The method of claim 1 wherein the step of combining the aqueous fluid volume and a quantity of at least one chlorine oxide comprises the steps of:
   a) introducing a first chlorine oxide into the aqueous volume either prior to or substantially contemporaneous with the step of introducing the oxidant, wherein said first chlorine oxide comprises sodium chlorite; and
   b) introducing a second chlorine oxide into the aqueous volume after the step of combining the aqueous volume and oxidant for said minimum residence time, wherein said second chlorine oxide comprises chlorine dioxide, chlorite, or a combination of the same.

3. The method according to claim 2 wherein sodium hydroxide is introduced into the aqueous volume prior to the step of introducing the oxidant, either in combination with the sodium chlorite or as a separate feed substantially contemporaneously therewith.

4. The method according to any of claims 1-3 comprising the additional step of measuring and maintaining a chlorine dioxide residual of at least about 0.1 mg/l in the aqueous volume after treatment.

5. The method of claim 4 wherein the chlorine dioxide residual is in the range of about 0.1 mg/l to about 50 mg/l in the aqueous volume.

6. The method according to any of claims 2-5 comprising the additional step of allowing solids formed in the aqueous volume to settle or rise and separating the solids from the wastewater contained therein prior to the step of introducing the second chlorine oxide into the aqueous volume.

7. The method according to any of claims 1-6 wherein the source of the aqueous volume is chosen from the group consisting of an aqueous fluid stream, a vessel, tank, pit, lagoon, or pond for storing waste water, a water treatment plant, a hydraulic fracturing tank, or a piece of equipment, pipeline or vessel used for hydraulic fracturing or crude oil production.

8. The method according to any of claims 1-6 wherein the aqueous system is chosen from the group consisting of hydraulic fracturing, crude oil production, water distribution systems, fluid transporting pipelines, wastewater treatment facilities, storage tanks, food and beverage processing lines, machining coolant or metalworking fluid (MWF) systems, coal and mineral slurries, metal leaching fluids, acid mine drainage, or any aqueous system contaminated by biological species or sulfur compounds.

9. The method according to any of claims 1-8 comprising the step of generating a chlorine dioxide aqueous solution using a chlorine dioxide generator that brings chlorine dioxide gas into contact with a portion of the aqueous volume to be treated under a vacuum pressure such that the chlorine dioxide gas is drawn into a portion of the aqueous volume to be treated to form the chlorine dioxide aqueous solution.

10. The method according to any of claims 1-9 wherein the aqueous system comprises one or more separation apparatus for removing precipitated contaminants from the aqueous volume either during, before or after treatment.

11. The method according to any of claims 1-10 that reduces, inactivates, destroys, eliminates or removes from the aqueous volume contaminants selected from the group consisting of Ca, Mg, Na, Fe, Cl, Mn, $CaClO_3$, $SO_4$, Ba, hydrocarbons, total dissolved solids, biological contamination, and combinations thereof.

12. A method for reducing, inactivating, destroying, removing, or eliminating from an aqueous fluid contaminants selected from the group consisting of Ca, Mg, Na, Fe, Cl, Mn, $CaClO_3$, $SO_4$, Ba, hydrocarbons, total dissolved solids, biological contamination, and combinations thereof, comprising the steps of introducing an oxidant and introducing at least one chlorine oxide, wherein said oxidant is selected from the group consisting of oxygen, air, oxygen-enriched air, and combinations thereof and said at least one chlorine oxide is selected from the group consisting of chlorine dioxide, chlorite, and combinations thereof.

13. The method of claim 12 wherein the step of introducing the at least one chlorine oxide comprises the steps of:
a) introducing a first chlorine oxide into the aqueous fluid either prior to or substantially contemporaneous with the step of introducing the oxidant, wherein said first chlorine oxide comprises sodium chlorite; and
b) introducing a second chlorine oxide into the aqueous fluid after the step of combining the aqueous fluid and oxidant, wherein said second chlorine oxide comprises chlorine dioxide, chlorite, or a combination of the same.

14. The method according to claim 13 wherein sodium hydroxide is introduced into the aqueous fluid prior to the step of introducing the oxidant, either in combination with the sodium chlorite or as a separate feed substantially contemporaneously therewith.

15. The method according to either of claims 13-14 wherein the second chloride oxide is an aqueous chlorine dioxide solution.

16. The method according to claim 15 further comprising the step of generating the chlorine dioxide aqueous solution by using a portion of the aqueous fluid to be treated.

17. The method of according to any of claims 12-16 wherein the oxidant is introduced at a flow rate that avoids off-gassing of volatile reductants from the aqueous fluid.

18. The method according to any of claims 12-17 comprising the additional step of measuring and maintaining a chlorine dioxide residual in the range of about 0.1 mg/l to about 50 mg/l in the aqueous fluid after treatment.

19. The method according to any of claims 12-18 wherein the source of the aqueous fluid stream or volume is chosen from the group consisting of a vessel, tank, pit, lagoon, or pond for storing waste water, a water treatment plant, a hydraulic fracturing tank, or a piece of equipment, pipeline or vessel used for hydraulic fracturing or crude oil production.

20. A method for treating an aqueous system, comprising:
introducing an oxidant into an aqueous volume at a flow rate that avoids off-gassing of volatile reductants from the aqueous volume prior to introducing chlorine dioxide into the volume, wherein said oxidant is selected from the group consisting of oxygen, air, oxygen-enriched air, and combinations thereof, and wherein the oxidant provides synergistic oxidation activity in the presence of the chlorine dioxide such that the chlorine dioxide is introduced at substantially reduced amounts as compared to a predetermined chlorine dioxide demand.

21. A method according to claim 20 comprising the additional step of introducing sodium chlorite into said volume prior to the step of introducing the oxidant.

22. A method for treating an aqueous system, comprising:
providing an aqueous volume having an initial oxidant demand;
introducing an oxidant into the aqueous volume, wherein said oxidant comprises oxygen, air, oxygen-enriched air, or a combination of the same, at a flow rate that avoids off-gassing of volatile reductants from the aqueous volume;
introducing sodium chlorite into the aqueous volume;
combining the aqueous volume, oxidant and sodium chlorite, thereby lowering the initial oxidant demand to a reduced oxidant demand;
introducing a separate feed of chlorine dioxide into the aqueous volume in an amount sufficient to eliminate the reduced oxidant demand and provide a chlorine dioxide residual of at least about 0.1 mg/l in the aqueous volume.

23. A method for treating an aqueous system, comprising:
providing an aqueous volume having an initial oxidant demand;
introducing an oxidant into the aqueous volume at a flow rate that avoids off-gassing of volatile reductants from the aqueous volume, wherein said oxidant comprises oxygen, air, oxygen-enriched air, ozone or a combination of the same;
combining the aqueous volume and oxidant for a minimum residence time sufficient to lower the initial oxidant demand to a reduced oxidant demand;
providing at least one chlorine oxide; and
combining the aqueous volume and a quantity of at least one chlorine oxide in an amount sufficient to eliminate the reduced oxidant demand, wherein said at least one chlorine oxide comprises chlorine dioxide, chlorite, or a combination of the same, provided that if the at least one chlorine oxide comprises chlorine dioxide than said aqueous volume does not comprise an ozone residual.

24. A method for treating wastewater comprising the following steps:

introducing a wastewater stream to a fluid treatment system, the fluid treatment system comprising at least one first treatment cell, at least one second treatment cell, and at least one third treatment cell;

flowing the wastewater stream through at least one first fluid flow line to the at least one first treatment cell; withdrawing at least a portion of the wastewater from the at least one first treatment cell through at least one second fluid flow line;

introducing air into the withdrawn portion of the wastewater through at least one in-line air treatment point within the at least one second fluid flow line under conditions sufficient to produce thorough mixing of the air within the wastewater, and introducing sodium chlorite into the withdrawn portion of the wastewater through at least one in-line sodium chlorite treatment point within the at least one second fluid flow line to produce treated wastewater;

recirculating the treated wastewater back to the at least one first treatment cell;

allowing solids formed in the treated wastewater to settle or rise in the at least one first treatment cell and separating the solids from the treated wastewater contained therein;

discharging the treated wastewater from the at least one first treatment cell to the at least one second treatment cell through at least one third fluid flow line, wherein chlorine dioxide gas is introduced into the treated wastewater through at least one in-line treatment point within the at least one third fluid flow line at a determined rate sufficient to provide a chlorine dioxide residual within the treated wastewater before discharge into at least one second treatment cell;

allowing solids formed in the treated wastewater to settle or rise in the at least one second treatment cell and separating the solids from the wastewater contained therein;

flowing the wastewater stream from the at least one second treatment cell to at least one first underflow outlet that discharges into the at least one third treatment cell;

allowing solids formed in the wastewater to settle or rise in the at least one second treatment cell and separating the solids from the wastewater contained therein;

and flowing the wastewater stream from the at least one third treatment cell to at least one first overflow outlet in fluid communication with a fourth treatment cell, vessel or clear well.

25. The method of claim 24 wherein sodium hydroxide is introduced into the wastewater through the at least one second fluid flow line either in combination with the sodium chlorite or as a separate feed substantially contemporaneously therewith.

26. The method according to any of claims 24-25 wherein the at least one first treatment cell provides a first residence time of between about 15 minutes to about 60 minutes.

27. The method according to any of claims 24-26 wherein the oxidant is introduced at a flow rate that avoids off-gassing of volatile reductants from the wastewater.

28. The method according to any of claims 24-27 wherein the at least one first treatment cell contains one or more separation apparatus for removing precipitated contaminants from the at least one first treatment cell.

29. The method according to any of claims 24-27 wherein the at least one first treatment cell contains one or more skimming apparatus for removing contaminants from the surface of the wastewater contained in the at least one first treatment cell.

30. The method of according to any of claims 24-29 wherein the at least one second treatment cell contains one or more skimming apparatus for removing contaminants from the surface of the wastewater contained in the at least one second treatment cell.

31. The method according to any of claims 24-30 wherein the at least one second treatment cell provides a second residence time of between about 10 minutes to about 30 minutes.

32. The method according to any of claims 24-31 wherein the at least one third treatment cell provides a third residence time of between about 10 minutes to about 30 minutes.

33. The method according to any of claims 24-32 wherein the at least one third treatment cell contains a separation apparatus for removing precipitated contaminants from the at least one third treatment cell.

34. The method according to any of claims 24-33 wherein wastewater is withdrawn from the first treatment cell through the at least one second fluid flow line via a pump, passed through at least one venturi and returned to the first treatment cell.

35. The method according to any of claims 24-34 wherein air is introduced into the second fluid flow line via the venturi.

36. The method of claim 35 wherein a solution of sodium chlorite, a combination of sodium chlorite and sodium hydroxide, or those two chemicals as separate feeds are introduced into the second fluid flow line via the at least one venturi.

37. The method according to any of claims 24-36 wherein the wastewater stream entering the fluid treatment system comprises an initial oxidant demand, and said treated wastewater entering the at least one second treatment cell has a reduced oxidant demand.

38. The method according to any of claims 24-37 wherein the portion of wastewater withdrawn from the first treatment cell through at least one second fluid flow line is withdrawn from a level approximately 20% up from the bottom the at least one first treatment cell.

39. The method according to any of claims 24-38 wherein the treated wastewater is discharged from the at least one second fluid flow line at substantially the midline of the at least one first treatment cell.

40. The method according to any of claims 24-39 that removes contaminants selected from the group consisting of Ca, Mg, Na, Fe, Cl, Mn, CaClO3, SO4, Ba, hydrocarbons, total dissolved solids, and biological contamination.

41. The method of claim 40 wherein the calcium and magnesium content, stated as CaCo3, of the treated fluid is reduced to less than about 2,200 mg/L.

42. The method of claim 40 wherein calcium and magnesium content, stated as CaCo3, of the treated fluid is reduced by up to 93%.

43. The method according to any of claims 24-39 wherein said method reduces, inactivates, destroys, or eliminates sulfur compounds, bacteria or a combination thereof from the aqueous volume.

44. The method according to any of claims 24-43 wherein the wastewater stream is produced water from an oil and gas production site.

45. The method according to any of claims 24-44 wherein the chlorine dioxide residual is in the range of about 0.1 mg/l to about 50 mg/l in the treated wastewater in the second treatment cell.

46. The method according to any of claims 24-45 wherein a source of the wastewater stream is chosen from the group consisting of an aqueous fluid stream, vessel, tank, pit, lagoon, or pond for storing waste water, a water treatment plant, a hydraulic fracturing tank, or a piece of equipment, pipeline or vessel used for hydraulic fracturing or crude oil production.

47. The method according to any of claims 24-46 wherein first treatment cell is a vessel chosen from the group consisting of a storage tank, hydraulic fracturing tank, or other onsite vessel used for hydraulic fracturing or crude oil production.

48. The method according to any of claims 24-47 wherein second and third treatment cell are located within a single vessel chosen from the group consisting of a storage tank, hydraulic fracturing tank, or other onsite vessel used for hydraulic fracturing or crude oil production.

49. The method according to any of claims 24-48 comprising the step of generating a chlorine dioxide aqueous solution using a chlorine dioxide generator that brings chlorine dioxide gas into contact with a portion of the wastewater stream to be treated under a vacuum pressure such that the chlorine dioxide gas is drawn into a portion of the wastewater stream to form the chlorine dioxide aqueous solution.

50. A fluid treatment system that performs the method according to any of claims 24-49.

51. A fluid treatment system for in-line use at a hydrocarbon producing well site comprising:
at least one first treatment cell, at least one second treatment cell, and at least one third treatment cell;
at least one first fluid flow line for flowing a wastewater stream with an initial oxidant demand into the at least one first treatment cell, said at least one first treatment cell having at least one outlet in fluid communication therewith;
at least one second fluid flow line for circulating wastewater from the at least one first treatment cell, said at least one first treatment cell having at least one outlet and at least one inlet in fluid communication therewith;
at least one first eductor, disposed in fluid communication with the at least one second fluid flow line and at least one oxidant source, for introducing at least one oxidant into the at least one second fluid flow line in controlled quantities and at a controlled flow rate;
at least one second eductor, disposed in fluid communication with the at least one second fluid flow line and at least one chlorine oxide source, for introducing at least one first chlorine oxide into the at least one second fluid flow line in controlled quantities;
at least one third fluid flow line for transferring treated wastewater from the at least one first treatment cell to the at least one second treatment cell, wherein said at least one third fluid flow line is in fluid communication with at least one outlet of said at least one first treatment cell and at least one inlet of said at least one second treatment cell;
at least one third eductor disposed in fluid communication with the at least one third fluid flow line and at least one chlorine dioxide source for introducing chlorine dioxide into the at least one third fluid flow line in controlled quantities and at a controlled flow rate; and
wherein first treatment cell comprises at least one skimming apparatus, at least one separation apparatus for removing precipitated contaminants from the at least one first treatment cell, and a residence time of between about 15 minutes to about 60 minutes;
wherein said second treatment cell comprises at least one skimming apparatus, at least one underflow outlet that discharges into the at least one third treatment cell, and a residence time of about 10 minutes to about 30 minutes;
and wherein said third treatment cell comprises at least one separation apparatus for removing precipitated contaminants from the at least one third treatment cell, at least one overflow outlet, and a residence time of about 10 minutes to about 30 minutes.

52. The system of claim 51 wherein the first eductor and second eductor are combined and configured to introduce the at least one oxidant prior to or simultaneously with introducing the at least one chlorine oxide.

53. The system of claim 52 wherein said oxidant is selected from the group comprising oxygen, air, oxygen-enriched air, and combinations thereof.

54. The system according to any of claims 52-53 wherein said at least one first chlorine oxide comprises an aqueous solution of sodium chlorite.

55. The system according to any of claims 52-54 wherein the controlled flow rate of the oxidant avoids off-gassing of volatile reductants from the wastewater.

56. The system according to any of claims 52-55 wherein the first treatment cell is a vessel, tank, or a piece of equipment or vessel used for hydraulic fracturing or crude oil production.

57. The aqueous system according to any of claims 52-56 wherein the chlorine dioxide residual in the treated wastewater in second treatment cell is in the range of about 0.1 mg/l to about 50 mg/l.

58. The aqueous system according to any of claims 52-57 wherein the first, second and third eductors are a venturi.

59. A method for treating wastewater comprising the follow steps:
introducing a wastewater stream to a fluid treatment system, the fluid treatment system comprising at least one first treatment cell, at least one second treatment cell, and at least one third treatment cell;
flowing the wastewater stream through at least one first fluid flow line to the at least one first treatment cell;
withdrawing at least a portion of the wastewater from the at least one first treatment cell through at least one second fluid flow line;
introducing an oxidant into the withdrawn portion of the wastewater through at least one in-line oxidant treatment point within the first fluid flow line under conditions sufficient to produce thorough mixing of the oxidant within the wastewater and at a controlled flow rate to avoid off-gassing of volatile reductants from the wastewater, wherein said oxidant is selected from the group consisting of oxygen, air, oxygen-enriched air, and combinations thereof, and introducing at least one chlorine oxide into the withdrawn portion of the wastewater through at least one in-line chlorine oxide treatment point within the at least one first fluid flow line to produce treated wastewater;
recirculating the treated wastewater back to the at least one first treatment cell, allowing solids formed in the treated wastewater to settle or rise in the at least one first treatment cell, and separating the solids from the treated wastewater contained therein;
discharging the treated wastewater from the at least one first treatment cell to the at least one second treatment cell through at least one third fluid flow line, wherein chlorine dioxide gas is introduced into the treated wastewater through at least one in-line treatment point within the at least one second fluid flow line at a determined rate sufficient to provide a chlorine dioxide residual within the treated wastewater before discharge into at least one second treatment cell;
allowing solids formed in the treated wastewater to settle or rise in the at least one second treatment cell and separating the solids from the wastewater contained therein;

flowing the wastewater stream from the at least one second treatment cell to at least one first underflow outlet that discharges into the at least one third treatment cell;

allowing solids formed in the wastewater to settle or rise in the at least one second treatment cell and separating the solids from the wastewater contained therein;

flowing the wastewater stream from the at least one third treatment cell to at least one first overflow outlet into at least one fourth treatment cell, vessel or clear well.

EXAMPLES

To facilitate a better understanding of the present invention, the following examples of embodiments in accordance with the invention are given. It should be understood, however, that no limitation of the scope of the invention is intended, and the following examples should not be read to limit or define the scope of the invention.

In the following examples, the effect of chlorine dioxide on oilfield wastewater, with and without oxygen treatment, was studied.

Example 1

The following experiment was conducted to determine how significantly the addition of air/oxygen affects chlorine dioxide (and/or chlorite) treatment of a sample of oilfield wastewater. The experimental results demonstrate that the combination of air/oxygen with chlorine dioxide or chlorite has an unexpected, beneficial result of substantially reducing the oxidant dosage required for oxidation of sulfides present in oilfield wastewater. Additionally, the combination of air/oxygen with chlorine dioxide unexpectedly achieves bacterial kill at significantly reduced dosages. In contrast, air/oxygen addition alone is not sufficient over a reasonable period of time to remove sulfides from wastewater or to kill bacteria present therein, and the addition of alternative oxidants (i.e. nitrogen) do not have the same synergistic effect.

For each of experiments 1(A)-1(G) below, a sample of water was used that contains 10 percent solids with 110 mg/l of sulfide in the aqueous phase and has a pH of 8.2. The solids consist of biomass, inorganic material, hydrocarbon, and insoluble sulfides at a concentration of 82.5 mg/kg. Sulfide reducing and general aerobic bacteria were cultured from the sample, demonstrating growth over $10^6$ cfu/ml. The sample (solution and solids) have a black coloration.

First, a series of experimental controls were conducted as follows:

Control A. A 200 ml portion of the sample was treated with 335 mg/l chlorine dioxide over a 15 minute period while stirring to achieve a trace (<1.0 mg/l) residual of chlorine dioxide in solution. The sample quickly turns from a black coloration to a brown/orange with the insoluble solids settling quickly and an iron type floc forming. There was also a slight sheen of hydrocarbon on the surface of the treated sample. No further change in appearance of the treated fluid was observed over 5 minutes. The solids (sludge) and fluid were analyzed for sulfide content using a Garret Gas Train. No detectable sulfides were found in the solids or fluids. Sulfur reducing and general aerobic bacteria were cultured from the sample, demonstrating no bacterial growth.

Control B. A 200 ml portion of the sample was treated with 230 mg/l chlorine dioxide over a five minute period while stirring. The sample quickly turns from a black coloration to a grey brown/orange with the insoluble solids settling quickly and an iron type floc forming. No further change in appearance of the treated fluid was observed over 5 minutes. The solids (sludge) and fluid were analyzed for sulfide content using a Garret Gas Train. There was 31 mg/l and 51 m/kg found in the fluid and sludge, respectively. No chlorine dioxide residual was present. Sulfur reducing and general aerobic bacteria were cultured from the sample, demonstrating bacterial growth over $10^6$ cfu/ml.

Control C. A 200 ml portion of the sample was treated with 420 mg/l of chlorite (560 mg/l as sodium chlorite) while stirring. The sample turns from a black coloration to a brown/orange with the insoluble solids settling and an iron type floc forming over a ten minute period. There was also a slight sheen of hydrocarbon on the surface of the treated sample. No further change in appearance of the treated fluid was observed after 10 minutes. The solids and fluid were analyzed for sulfide content using a Garret Gas Train. No detectable sulfides were found in the fluids, however the solids contain approximately 15 mg/l sulfide. Sulfur reducing and general aerobic bacteria were cultured from the sample, demonstrating growth over $10^6$ cfu/ml.

Control D. A 200 ml portion of the sample was sparged with air through a fine diffuser stone at a rate of 2 SLPM for 30 minutes. Over the 30-min period, the sample turns from a black coloration to a grey coloration. The solids (sludge) and fluid were analyzed for sulfide content using a Garret Gas Train. The fluid contains 60 mg/l sulfide and the solids contain 75 mg/l sulfide. Sulfur reducing and general aerobic bacteria were cultured from the sample, demonstrating growth over $10^6$ cfu/ml.

Sparging experiments were then conducted in three systems (air-chlorine dioxide, nitrogen-chlorine dioxide, and air-chlorite) as follows:

Experiment E. A 200 ml portion of the sample was sparged with air through a fine diffuser stone at a rate of 2 SLPM for four (4) minutes. Initiated concurrently, a dose of 230 mg/l chlorine dioxide was added over a five (5) minute period, with the last minute of dosing being added without air sparging. In this example, ClO2 is added at a low enough rate with a volume and flow rate of air that does not strip the chlorine dioxide before it reacts. The sample quickly turns from a black coloration to a brown/orange with the insoluble solids settling quickly and an iron type floc forming upon the cessation of sparging. No further change in appearance of the treated fluid was observed over five (5) minutes. The solids (sludge) and fluid were analyzed for sulfide content using a Garret Gas Train. There were no detectable sulfides in the solids or fluid. Sulfur reducing and general aerobic bacteria were cultured from the sample, demonstrating no bacterial growth.

Experiment F. A 200 ml portion of the sample was sparged with nitrogen through a fine diffuser stone at a rate of 2 SLPM for four (4) minutes. Initiated concurrently, a dose of 230 mg/l chlorine dioxide was added over a five (5) minute period, with the last minute of dosing being added without nitrogen sparging. The sample quickly turns from a black coloration to a brown/orange with the insoluble solids settling quickly and an iron type floc forming upon the cessation of sparging. No further change in appearance of the treated fluid was observed over 5 minutes. The solids (sludge) and fluid were analyzed for sulfide content using a Garret Gas Train. There were 7 mg/l and 160 mg/l sulfides remaining in the fluid and the solids, respectively. Sulfur reducing and general aerobic bacteria were cultured from the sample, demonstrating over $10^6$ bacterial growth.

Experiment G. A 200 ml portion of the sample was sparged with air through a fine diffuser stone at a rate of 2

SLPM for 15 minutes. Initiated concurrently, a dose of 300 mg/l of chlorite (402 mg/l as sodium chlorite) was added over a five (5) minute period. The sample turns from a black coloration to a brown/orange with the insoluble solids settling quickly and an iron type floc forming upon the cessation of sparging. No further change in appearance of the treated fluid was observed over 15 minutes. The solids (sludge) and fluid were analyzed for sulfide content using a Garret Gas Train. There were no detectable sulfides in the solids or fluid. Sulfur reducing and general aerobic bacteria were cultured from the sample, demonstrating bacterial growth over $10^6$ cfu/ml.

In the following examples, the unexpected, synergistic effect of treating a storage tank with oilfield wastewater with a treatment of chlorine dioxide and oxygen in a closed loop system was studied. Sparging experiments were conducted on two systems (air-chlorine dioxide only, and air-chlorite-chlorine dioxide) as follows:

Example 2

A tank containing about 30,000 barrels (bbl) of produced fresh and flow back water was analyzed and found to contain 16,000 mg/l TDS, over $10^6$ cfu/ml bacteria, and 40 mg/l sulfides in the homogenized fluid at a pH of 7.8. The chlorine dioxide demand of the fluid to be treated was determined to be 180 mg/l. The amount of 50% sodium hydroxide required to maintain the pH was determined to be 630 gallons.

The tank was rigged to a chlorine dioxide generator (see, e.g. U.S. Pat. No. 6,468,479). Although not limiting, one example of generator would be a Sabre BB series portable DiKlor® generation system with a maximum capacity of 24,000 lbs. per day continuous production. This system is self-contained and has a distribution system that allows it to circulate fluids in the tank. More specifically, a drive fluid stream was withdrawn from the tank and circulated through a chlorine dioxide generator by means of a centrifugal pump at a rate of 320 gallons per minute. The generator is arranged so that the suction for the drive fluid stream is pulled from the lowest end of the tank, and the discharge solution containing chlorine dioxide and/or air was returned to the tank and discharge to the bottom of the tank via a movable injection boom. (See FIGS. 5 & 8). The injection boom was continuously moved around the tank at a rate of 50 feet per minute.

Sodium hydroxide was added to the tank with enough sodium chlorite to absorb approximately 10 percent of the theoretical chlorine dioxide demand. In this specific example, and in accordance with calculations readily known in the art, the amount of sodium chlorite required to absorb 10% of the chlorine dioxide demand was a dosage of approximately 23 mg/l chlorite. The sodium hydroxide and chlorite were added over a sixty minute period with air at a rate of 125 SCFM. In this embodiment, air was introduced via a venturi. At the end of the 60-minute period, the injection of air is discontinued, and chlorine dioxide demand was retested and found to be 27 mg/l. Chlorine dioxide then was introduced via a venturi at an appropriate rate to achieve a dosage of 47 mg/l over a 30 minute period. No air was introduced during the chlorine dioxide step.

The resulting fluid was clear with orange/brown sediment and had a thin layer of floc on top that was determined to be 98% inorganic material and 2% hydrocarbons. 8 mg/l chlorine dioxide was found as a residual in the fluid. The fluid, sludge, and floc were analyzed by garret gas train and determined to contain no sulfides. No bacterial growth was found by culture analysis. The fluid was analyzed to determine suitability for "gelling" for fracturing use. The fluid gelled and cross linked without difficulty. This method resulted in a 75% reduction in the amount of chlorine dioxide required to achieve the target chlorine dioxide residual and no bacterial grown.

Example 3

A tank containing about 30,000 bbl of produced fresh and flow back water was analyzed and found to contain 16,000 mg/l TDS, over $10^6$ cfu/ml bacteria, and 40 mg/l sulfides in the homogenized fluid at a pH of 7.8. The chlorine dioxide demand of the fluid was determined to be 180 mg/l. The tank was rigged to a chlorine dioxide generator where the suction for a drive fluid stream is pulled from the lowest end of the tank, and the discharge solution containing chlorine dioxide and/or air was returned to the tank and discharge to the bottom of the tank via a movable injection boom. The injection boom was continuously moved around the tank at a rate of 50 feet per minute. The fluid was withdrawn from the tank and circulated through the chlorine dioxide generator by means of a centrifugal pump at a rate of 320 gallons per minute.

In this example, chlorite was not added directly to the system as sodium chlorite. Instead, chlorine dioxide was added to the tank initially (which converted to chlorite), followed by air and then a second dosage of chlorine dioxide as set forth below. More specifically, 1) from time zero (0) and over the first 10 minutes, chlorine dioxide was added to provide 20% of the total dosage; 2) from minute 10 through minute 30, the solution was circulated; 3) from minute 30 to minute 60, air was added; and 3) from minute 60 through minute 80, the remaining 80% of the chlorine dioxide was introduced into the tank. In total, the tank was treated with 110 mg/l chlorine dioxide over an aggregate (but, nonconsecutive) 50-minute period. In regards to step 2, one of ordinary skill in the art will recognize that, when a big tank is used, one has to be careful not to get localized "hot spots" and allow the chlorine dioxide to disperse a bit.

In step 3, air was added in isolation through a venturi at a rate of 100 SCFM to tank 250 from minute 30 to minute 60. In alternate embodiments, one could add low dosages of ClO2 with air, depending on the size and depth of the vessel, as well as the flow rate. Sodium hydroxide was added concurrently to maintain stable pH. The fluid was analyzed post treatment. The resulting fluid was clear with orange/brown sediment and had a thin layer of floc on top that was determined to be 98% inorganic material and 2% hydrocarbons. 12 mg/l chlorine dioxide was found as a residual in the fluid. The fluid, sludge, and floc were analyzed by garret gas train and determined to contain no sulfides. No bacterial growth was found by culture analysis. The fluid was analyzed to determine suitability for "gelling" for fracturing use. The fluid gelled and cross linked without difficulty. This method resulted in about a 40% reduction in the amount of chlorine dioxide required to achieve a target chlorine dioxide residual and no bacterial grown.

Example 4

A tank contained 4200 gallons of produced water. The homogenized fluid was analyzed and found to contain 23,000 mg/l TDS, over 104 cfu/ml bacteria, and 175 mg/l sulfides with a pH of 7.8. The chlorine dioxide demand of the fluid was determined to be 580 mg/l. The tank was rigged to a chlorine dioxide generator where the suction for the drive fluid stream is pulled from the lowest end of the tank, and the discharge solution containing chlorine dioxide and/or air via a perforated pipe along the length of the bottom of the tank. The fluid is withdrawn from the tank and circulated through the chlorine dioxide generator by means of a centrifugal pump at a rate of 320 gallons per minute.

As in Example 3, chlorine dioxide was added to the tank initially via a venturi 320, followed by air and then a second dosage of chlorine dioxide as set forth below. More specifically, 1) from time zero (0) and over the first minute, chlorine dioxide was added to provide 20% of the total dosage; and then 2) from minute six (6) through minute ten (10), the remaining 80% of the chlorine dioxide was introduced into the tank. In total, the tank was treated with 310 mg/l chlorine dioxide over an aggregate (but, nonconsecutive) 5-minute period. Air was added through a venturi at a rate of 50 SCFM to the tank from minute one (1) to minute six (6). Sodium hydroxide was added concurrently to maintain stable pH. The fluid was analyzed post treatment. The fluid was clear with orange/brown sediment and had a thin layer of floc on top that was determined to be 96% inorganic material and 4% hydrocarbons. 7 mg/l chlorine dioxide was found as a residual in the fluid. The fluid, sludge, and floc were analyzed by garret gas train and determined to contain no sulfides. No bacterial growth was found by culture analysis. This method resulted in about a 47% reduction in the amount of chlorine dioxide required to achieve a target chlorine dioxide residual and no bacterial grown.

Example 5

A tank contained 4200 gallons of produced water. The homogenized fluid was analyzed and found to contain 23,000 mg/l TDS, over 104 cfu/ml bacteria, and 175 mg/l sulfides with a pH of 7.8. The chlorine dioxide demand of the fluid was determined to be 580 mg/l. The tank was rigged to a chlorine dioxide generator where the suction for the drive fluid stream is pulled from the lowest end of the tank, and the discharge solution containing chlorine dioxide and/or air via a perforated pipe along the length of the bottom of the tank. The fluid is withdrawn from the tank and circulated through the chlorine dioxide generator by means of a centrifugal pump at a rate of 320 gallons per minute.

In this example, chlorite was introduced directly at a rate to achieve a dosage of 120 mg/l over the first minute. Chlorine dioxide also was added at a rate to achieve a dosage of 210 mg/l over an aggregate five (5) minute period. Specifically, chlorine dioxide was added from time zero (0) to minute one (1), and then again from minute six (6) to minute ten (10). Air was added through a venturi at a rate of 50 SCFM to the tank from minute zero to minute nine. Sodium hydroxide was added concurrently to maintain stable pH. The fluid was analyzed post treatment.

The treated fluid was clear with orange/brown sediment and had a thin layer of floc on top that was determined to be 96% inorganic material and 4% hydrocarbons. 7 mg/l chlorine dioxide was found as a residual in the fluid. The fluid, sludge, and floc were analyzed by garret gas train and determined to contain no sulfides. No bacterial growth was found by culture analysis. This method resulted in about a 43% reduction in the amount of chlorine oxides required to achieve a target chlorine dioxide residual and no bacterial grown.

The following experimental results demonstrate that the combination of oxidant 40 (air/oxygen) with chlorite (30$b$), followed by introduction of chlorine dioxide (30$a$), has an unexpected, beneficial result of substantially reducing unwanted contaminants in oilfield wastewater (or produced water), including Ca, Mg, Na, Fe, Cl, Mn, TDS, $CaClO_3$, $SO_4$, Ba, oil, grease, as well as bacterial contamination, such that the treated fluids are suitable for reuse as fracturing fluids.

Example 6

A treatment train is arranged for a typical produced fluid (2) from northern Texas production. Approximately six barrels per minute of fluid is transferred via a circulation pump (3) to a 500 barrel frac tank (first frac tank 101) at a steady flow rate. Approximately four barrels per minute of fluid is withdrawn from a level 2 feet above the bottom of the first frac tank (101). This fluid (2$a$) is passed through a venturi (4) where air (40), sodium chlorite (30$b$) and sodium hydroxide (90) are added to the fluid stream. The fluid stream (2$a$) that reenters the first frac tank (101) containing the air (4), chlorite (30$b$) and caustic (90) is introduced along the centerline (8$a$) of the tank (101) through a distribution bar (19) running the length of the tank (101). For this example, chlorite (30$b$) is introduced to achieve a dosage of 50 mg/l and oxidant (40) is added to achieve a dosage of 400 mg/l. A skimmer (6) is placed into the top of the first frac tank (101) to recover floating material.

Fluid (2$a$) is withdrawn to a second frac tank (102) via a discharge approximately 2 feet from the bottom of the first frac tank (101). The fluid (2$a$) is introduced into the second frac tank (102) at approximately the 2 foot level. Chlorine dioxide (30$a$) is injected into the fluid stream between the first and second frac tanks (101, 102). For this example, chlorine dioxide (30$a$) is added to achieve a dosage of 25 mg/l. Fluid (2$b$) from the second frac tank (102) under flows to the third frac tank (103). Fluid (2$c$) from the third frac tank (103) overflows to the clear well (104).

In this example, the produced fluid (2) that flowed into the first frac tank (101) originally contained approximately 1% by volume petroleum hydrocarbon. In the first frac tank (101) the free hydrocarbon was predominantly recovered at the surface. In the second frac tank (102), iron sulfide (FeS) that was oxidized by the chlorine dioxide reacted to form iron three hydroxide. The low density solids formed by this reaction and additional hydrocarbons further liberated were recovered by a surface skim of the second frac tank. The high density solids that were formed as part of this process dropped to the bottom of the common second and third tanks. The third tank (103) overflowed into a clear well (104). The treated fluid (2$d$) was pumped out of the clear well (104) for further storage. Treated fluid has a chlorine dioxide residual of 20 mg/l. Tables 1A-1C denotes the results obtained by the above method and system.

TABLE 1A

| Field Trial | | $H_2S$ | $Ca^{++}$ | % | $Mg^{++}$ | % | $Na^+$ | % | $Ba^+$ |
|---|---|---|---|---|---|---|---|---|---|
| Sample | Description | pH | Mg/l | Mg/l | Red | Mg/l | Red | Mg/l | Red | Mg/l |
| RAW WATER IN | FLOW LINE FROM TANK FARM | 6.87 | 23.00 | 12,363 | | 4,230 | | 44,580 | | 72.00 |

TABLE 1A-continued

| Field Trial | | | H$_2$S | Ca$^{++}$ | % | Mg$^{++}$ | % | Na$^+$ | % | Ba$^+$ |
|---|---|---|---|---|---|---|---|---|---|---|
| Sample | Description | pH | Mg/l | Mg/l | Red | Mg/l | Red | Mg/l | Red | Mg/l |
| TREATED WITH AIR AND DIKLOR | VESSEL 1 | 7.80 | 0.00 | 1,801 | 85% | 688 | 84% | 17,270 | 61% | 1.10 |
| TREATED WITH ClO2 | FLOW LINE FROM VESSEL 1 TO 2 after ClO2 | 7.77 | 0.00 | 1,777 | 86% | 134 | 97% | 14,353 | 68% | 0.82 |
| TANK 2 WEIR | VESSEL 2 | 6.91 | 0.00 | 1,044 | 92% | 210 | 95% | 8,826 | 80% | 0.77 |
| TANK 2 WEIR | VESSEL 3 | 6.88 | 0.00 | 1,401 | 89% | 333 | 92% | 11,657 | 74% | 0.68 |
| TANK 2 WEIR | VESSEL 4 | 6.94 | 0.00 | 1,209 | 90% | 319 | 92% | 8,929 | 80% | 0.65 |
| TREATED WATER OUT | FLOW LINE TO STORAGE | 6.82 | 0.00 | 1,022 | 92% | 303 | 93% | 8,753 | 80% | 0.73 |

TABLE 1B

| Field Trial | | Mn$^{++}$ | Sr$^+$ | OH$^-$ | CO$_3^{-2}$ | HCO$_2^-$ | SO$_4^{-2}$ | Cl | % | Fe$_{(tot)}$ | |
|---|---|---|---|---|---|---|---|---|---|---|---|
| Sample | Description | Mg/l | Mg/l | Mg/l | Mg/l | Mg/l | Mg/l | Mg/L | Red | Mg/l | |
| RAW WATER IN | FLOW LINE FROM TANK FARM | 7.22 | 158.00 | 0.00 | 0.00 | 97.76 | 278.00 | 84,264 | | 96.32 | |
| TREATED WITH AIR AND DIKLOR | VESSEL 1 | 1.80 | 22.20 | 0.00 | 0.00 | 391.04 | 75.20 | 32,411 | 62% | 5.15 | 95% |
| TREATED WITH ClO2 | FLOW LINE FROM VESSEL 1 TO 2 after ClO2 | 0.35 | 1.30 | 0.00 | 36.00 | 293.28 | 70.10 | 26,254 | 69% | 0.54 | 99% |
| TANK 2 WEIR | VESSEL 2 | 0.33 | 1.10 | 0.00 | 0.00 | 366.60 | 65.30 | 17,458 | 79% | 0.77 | 99% |
| TANK 2 WEIR | VESSEL 3 | 0.15 | 0.68 | 0.00 | 0.00 | 342.16 | 68.20 | 16,183 | 81% | 0.77 | 99% |
| TANK 2 WEIR | VESSEL 4 | 0.18 | 0.50 | 0.00 | 0.00 | 317.22 | 59.30 | 17,854 | 79% | 0.91 | 99% |
| TREATED WATER OUT | FLOW LINE TO STORAGE | 0.26 | 0.54 | 0.00 | 0.00 | 366.60 | 64.23 | 17,814 | 79% | 0.68 | 99% |

TABLE 1C

| Sample | Description | TDS Mg/l | % Red | TPH | % Red | SpG |
|---|---|---|---|---|---|---|
| RAW WATER IN | FLOW LINE FROM TANK FARM | 142,563 | | 9,875.00 | | 1.097 |
| TREATED WITH AIR AND DIKLOR | VESSEL 1 | 52,874 | 63% | 2,642.00 | 73% | 1.035 |
| TREATED WITH ClO2 | FLOW LINE FROM VESSEL 1 TO 2 after ClO2 | 38,256 | 73% | 2,355.00 | 76% | 1.038 |
| TANK 2 WEIR | VESSEL 2 | 32,154 | 77% | 35.00 | 100% | 1.022 |
| TANK 2 WEIR | VESSEL 3 | 34,327 | 76% | 22.63 | 100% | 1.025 |
| TANK 2 WEIR | VESSEL 4 | 32,456 | 77% | 18.15 | 100% | 1.025 |
| TREATED WATER OUT | FLOW LINE TO STORAGE | 33,529 | 76% | 11.20 | 100% | 1.020 |

Example 7

A treatment train is arranged for a typical produced fluid from Permian Basin production. Approximately six barrels per minute of fluid is transferred via a pump to a 500 barrel frac treatment tank (101) at a steady flow rate from a bank of six frac storage tanks (500). The six storage frac tanks (500) are filled by truck from the field. Approximately four barrels per minute of fluid is withdrawn from a level 2 feet above the bottom of the first frac treatment tank (101). This fluid (2a) is passed through a venturi (4), where air (40), sodium chlorite (30b) and sodium hydroxide (90) are added to the fluid stream. The fluid stream that reenters the first frac treatment tank, and which contains air (40), chlorite (30b) and caustic (90), is introduced along the centerline of the first frac tank (101) through a distribution bar (19) running the length of the tank (101). For this example, chlorite (30b) is introduced to achieve a dosage of 50 mg/l and oxidant (40) is added to achieve a dosage of 400 mg/l (e.g. 2200 mg/l air). A skimmer (6) is placed into the top of the tank (101) to recover floating material.

Fluid is withdrawn to a second frac tank (102) via a discharge approximately 2 feet from the bottom of the first tank (101) and is introduced into the second tank (102) at approximately the 2 foot level. Chlorine dioxide (30a) is injected into the fluid stream between the first and second tanks (101, 102). For this example, chlorine dioxide (30*a*) is added to achieve a dosage of 25 mg/l. Fluid (2*b*) from the second tank (102) under flows to the third tank (103). Fluid (2*c*) from the third tank (103) overflows to the clear well (104).

In the first tank (101), the free hydrocarbon was predominantly recovered at the surface. In the second tank (102), iron sulfide oxidized by the chlorine dioxide reacted to form iron three hydroxide. The low density solids that were formed by this reaction and the hydrocarbon that was liberated was recovered by a surface skim of this tank. The high density solids that were formed dropped to the bottom of the second and third cells/tanks. The third cell/tank (103) overflowed into a clear well (104). Fluid (2*d*) was pumped out of the clear well (104) for further storage. Treated fluid has a chlorine dioxide residual of 20 mg/l.

In this example, the inlet fluid measured 60 ppm by volume of petroleum hydrocarbon in grab samples. This measurement was inaccurate, however, due to the nature of the truck transfer. Some trucks that came in had no visible hydrocarbon, while others contained several percent due to slugs of hydrocarbon that went into the system. A large amount of hydrocarbon was recovered from the first and second tanks by skimming, representing 1.72% of the total fluid feed. There was no visible hydrocarbon present in the third frac tank and the fluid grab samples in the discharge from the last tank showed an average of 45 ppm total hydrocarbon.

Tables 2A-2C denotes the results obtained by this treatment.

TABLE 2A

| Field Trial | | | $H_2S$ | $Ca^{++}$ | % | $Mg^{++}$ | % | $Na^+$ | % | $Ba^+$ |
|---|---|---|---|---|---|---|---|---|---|---|
| Sample | Description | pH | Mg/l | Mg/l | Red | Mg/l | Red | Mg/l | Red | Mg/l |
| RAW WATER IN | FLOW LINE FROM TANK FARM | 6.66 | 31.00 | 1,153 | | 356 | | 12,800 | | 42.80 |
| TREATED WITH AIR AND DIKLOR | VESSEL 1 | 7.75 | 0.00 | 652 | 43% | 385 | −8% | 12,952 | −1% | 1.02 |
| TREATED WITH ClO2 | FLOW LINE FROM VESSEL 1 to 2 after ClO2 | 7.70 | 0.00 | 680 | 41% | 288 | 19% | 11,383 | 11% | 0.77 |
| TANK 2 WEIR | VESSEL 2 | 6.88 | 0.00 | 754 | 35% | 272 | 24% | 8,562 | 33% | 0.36 |
| TANK 2 WEIR | VESSEL 3 | 6.58 | 0.00 | 432 | 63% | 254 | 29% | 9,256 | 28% | 0.33 |
| TANK 2 WEIR | VESSEL 4 | 6.64 | 0.00 | 258 | 78% | 248 | 30% | 8,255 | 36% | 0.41 |
| TREATED WATER OUT | Flow Line to Storage | 6.61 | 0.00 | 322 | 72% | 252 | 29% | 8,356 | 35% | 0.26 |

TABLE 2B

| Sample | Description | $Mn^{++}$ Mg/l | $Sr^+$ Mg/l | $OH^-$ Mg/l | $CO_3^{-2}$ Mg/l | $HCO_2^-$ Mg/l | $SO_4^{-2}$ Mg/l | Cl Mg/L | % Red | $Fe_{(tot)}$ Red | % Red |
|---|---|---|---|---|---|---|---|---|---|---|---|
| RAW WATER IN | FLOW LINE FROM TANK FARM | 1.15 | 44.80 | 0.00 | 0.00 | 115.20 | 321.00 | 30,153 | | 77.50 | |
| TREATED WITH AIR AND DIKLOR | VESSEL 1 | 1.35 | 11.30 | 0.00 | 13.00 | 432.00 | 82.60 | 31,070 | −3% | 22.10 | 71% |
| TREATED WITH ClO2 | FLOW LINE FROM VESSEL 1 to 2 after ClO2 | 0.26 | 2.52 | 0.00 | 42.00 | 277.30 | 78.10 | 28,453 | 6% | 4.50 | 94% |
| TANK 2 WEIR | VESSEL 2 | 0.21 | 1.15 | 0.00 | 0.00 | 250.60 | 69.30 | 27,854 | 8% | 6.20 | 92% |
| TANK 2 WEIR | VESSEL 3 | 0.22 | 0.88 | 0.00 | 0.00 | 262.00 | 69.69 | 26,510 | 12% | 13.90 | 82% |
| TANK 2 WEIR | VESSEL 4 | 0.26 | 0.68 | 0.00 | 0.00 | 320.80 | 62.10 | 24,123 | 20% | 4.20 | 95% |
| TREATED WATER OUT | Flow Line to Storage | 0.18 | 0.57 | 0.00 | 0.00 | 311.10 | 64.00 | 22,110 | 27% | 3.90 | 95% |

TABLE 2C

| Sample | Description | TDs Mg/l | % Red | TPH | % Red | SpG |
|---|---|---|---|---|---|---|
| RAW WATER IN | FLOW LINE FROM TANK FARM | 44,200 | | 17,450.00 | | 1.031 |
| TREATED WITH AIR AND DIKLOR | VESSEL 1 | 46,501 | −5% | 2,638.00 | 85% | 1.033 |
| TREATED WITH ClO2 | FLOW LINE FROM VESSEL 1 to 2 after ClO2 | 42,150 | 5% | 2,254.00 | 87% | 1.029 |
| TANK 2 WEIR | VESSEL 2 | 38,273 | 13% | 54.20 | 100% | 1.024 |
| TANK 2 WEIR | VESSEL 3 | 36,504 | 17% | 34.20 | 100% | 1.015 |
| TANK 2 WEIR | VESSEL 4 | 35,888 | 19% | 38.70 | 100% | 1.017 |
| TREATED WATER OUT | Flow Line to Storage | 36,210 | 18% | 45.20 | 100% | 1.018 |

The process of the present invention is unexpectedly and economically effective at removing contaminants from highly contaminated, hydrocarbon-bearing produced water streams. The reduction of most of the contaminants is in the range of 75-98% as shown in Tables 1 and 2. As such, the treated water is acceptable to be used as a hydraulic fracturing fluid without further treatment, in most cases, or as a feed stream that can be further treated (if necessary) for disposal to the environment. The removal of a high level of contaminants, such as Ca, Mg, Na, Fe, Cl, Mn, TDS, CaClO$_3$, SO$_4$, Ba, hydrocarbons and biological contamination, as achieved by the claimed process is highly desirable for treating the large quantities of produced water contaminated waste streams created by oil field applications. The process also beneficially, and significantly, avoids off-gassing of harmful, regulated volatile compounds such as hydrogen sulfide.

While the preferred application for the method and system disclosed herein is in the oil field applications, such as petroleum wells, downhole formations, and industrial and petroleum process water, additional industrial applications include, but are not limited to, cooling water systems, mineral process waters, geothermal wells, paper mill digesters, washers, bleach plants, stock chests, and white water systems, black liquor evaporators in the pulp industry, continuous casting processes in the metallurgical industry, air conditioning and refrigeration systems, water reclamation systems, water purification systems, membrane filtration systems, food processing streams (meat, vegetable, sugar cane, poultry, fruit and soybean); and waste treatment systems as well as clarifiers, municipal sewage treatment, municipal water systems, potable water systems, aquifers, and water tanks. Furthermore, for purposes of this disclosure, aqueous volume, wastewater stream, wastewater, aqueous fluid volume, and aqueous fluid stream are all considered to be the fluid to be treated by the method and system disclosed herein.

Various embodiments and modifications of this invention have been described in the foregoing description. Such embodiments and modifications are illustrative only and are not to be taken as limiting in any way the scope of the invention, which is defined by the following claims. Other variations of what has been described also fall within the scope of the invention, and the present invention may be modified and practices in different but equivalent manners apparent to those skilled in the art having the benefit of the teachings herein. Furthermore, no limitations are intended to the details of construction or design herein shown, other than as described in the claims below. All numbers and ranges disclosed above may vary by some amount. Also, the terms in the claims shall have their plain, ordinary meaning unless otherwise explicitly and clearly defined by the patentee. Subject matter incorporated by reference is not considered to be an alternative to any claim limitations, unless otherwise explicitly indicated.

The invention claimed is:

1. A fluid treatment system comprising
   (i) a first treatment vessel for holding a volume of aqueous fluid;
   (ii) a circulation pump for recirculating aqueous fluid such that a stream of aqueous fluid flows out of the first treatment vessel, through a venturi, and back into the first treatment vessel, the venturi being connected with a source of an oxidant, such that the oxidant can be introduced into the stream of recirculating aqueous fluid using the venturi, the oxidant being air, oxygen ($O_2$), or a combination thereof;
   (iii) a source of chlorine oxide connected for introduction into recirculating aqueous fluid, the source of chlorine oxide configured to provide a chlorine oxide consisting essentially of chlorite, chlorine dioxide, or a combination thereof,
   (iv) a transfer line for transferring aqueous fluid from the first treatment vessel into a second treatment vessel,
   (v) a second treatment vessel, and
   (vi) an injection port connected to a source of chlorine dioxide for introducing chlorine dioxide into aqueous fluid that flows from the first treatment vessel into the second treatment vessel.

2. The fluid treatment system of claim 1, the source of chlorine dioxide comprising a chlorine dioxide generator including a second venturi that is in-line with the injection port.

3. The fluid treatment system of claim 2, comprising a skimming means for removing floating material from the surface of aqueous fluid contained in the second treatment vessel.

4. The fluid treatment system of claim 2, comprising an underflow means from the second treatment vessel to a third treatment vessel.

5. The fluid treatment system of claim 4, comprising an overflow means from the third treatment vessel to a fourth vessel or clear well.

6. A fluid treatment system comprising
   (i) a first treatment vessel for holding a volume of aqueous fluid;
   (ii) a circulation pump for recirculating aqueous fluid out of the first treatment vessel, through a recirculation line, and back into the first treatment vessel;

(iii) a venturi that is in-line with the recirculation line, the venturi being connected with a source of air and/or oxygen ($O_2$) and a source of chlorite;
(iv) a transfer line through which aqueous fluid can flow from the first treatment vessel into a second treatment vessel;
(v) the second treatment vessel having an underflow means leading from the second treatment vessel to a third treatment vessel;
(vi) a chlorine dioxide generator suitable for producing chlorine dioxide connected for introduction into aqueous fluid that flows into the second treatment vessel;
(vii) the third treatment vessel with an overflow means to a fourth vessel or clear well; and
(viii) the fourth vessel or clear well.

7. The fluid treatment system of claim 6, comprising a skimming means for removing floating material from the surface of aqueous fluid in the first treatment vessel.

8. A fluid treatment system comprising
(i) a first treatment vessel that holds a volume of aqueous fluid;
(ii) a circulation pump that recirculates aqueous fluid such that a stream of aqueous fluid flows out of the first treatment vessel, through a venturi, and back into the first treatment vessel, the venturi being connected with a source of oxidant, such that the venturi educts an oxidant into the stream of recirculating aqueous fluid, the oxidant being air, oxygen ($O_2$), or a combination therefore;
(iii) a source of chlorine oxide connected for providing a chlorine oxide to recirculating aqueous fluid, the chlorine oxide consisting essentially of chlorite, chlorine dioxide, or a combination thereof;
(iv) a transfer line through which aqueous fluid flows from the first treatment vessel to a second treatment vessel,
(v) the second treatment vessel, and
(vi) a chlorine dioxide generator that produces chlorine dioxide that is introduced into the aqueous fluid that flows into the second treatment vessel.

9. The fluid treatment system of claim 8, comprising a skimming means for removing floating material from the surface of aqueous fluid contained in the second treatment vessel.

10. The fluid treatment system of claim 8, comprising an underflow means from the second treatment vessel to a third treatment vessel.

11. The fluid treatment system of claim 10, comprising an overflow means from the third treatment vessel to a fourth vessel or clear well.

12. A fluid treatment system comprising
(i) a first treatment vessel that holds a volume of aqueous fluid;
(ii) a circulation pump that recirculates aqueous fluid such that aqueous fluid flows out of the first treatment vessel, through a venturi and back into the first treatment vessel;
(iii) the venturi through which a stream of the aqueous fluid passes as it recirculates, the venturi introducing air and/or oxygen ($O_2$), sodium chlorite, and, optionally, sodium hydroxide into the stream of recirculating aqueous fluid;
(iv) a transfer line through which aqueous fluid flows from the first treatment vessel into a second treatment vessel;
(v) the second treatment vessel having an underflow through which aqueous fluid flows from the second treatment vessel into a third treatment vessel;
(vi) a chlorine dioxide generator that produces chlorine dioxide that is introduced into aqueous fluid that flows into the second treatment vessel;
(vii) the third treatment vessel from which aqueous fluid overflows to a fourth vessel or clear well; and
(viii) the fourth vessel or clear well.

13. The fluid treatment system of claim 8, comprising a skimming means for removing floating material from the surface of aqueous fluid contained in the first treatment vessel.

* * * * *